US008127230B2

(12) United States Patent
Hirayama et al.

(10) Patent No.: US 8,127,230 B2
(45) Date of Patent: Feb. 28, 2012

(54) DISPLAY CONTROL DEVICE, IMAGE FORMING APPARATUS, METHOD FOR CONTROLLING DISPLAY DEVICE, AND STORAGE MEDIUM

(75) Inventors: Yasutaka Hirayama, Osaka (JP); Makio Gotoh, Osaka (JP); Takafumi Hosogi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 243 days.

(21) Appl. No.: 12/583,807

(22) Filed: Aug. 26, 2009

(65) Prior Publication Data

US 2010/0058180 A1 Mar. 4, 2010

(30) Foreign Application Priority Data

Aug. 27, 2008 (JP) .................. 2008-218839

(51) Int. Cl.
*G06F 17/00* (2006.01)
*H04N 1/46* (2006.01)
(52) U.S. Cl. ......... 715/274; 715/243; 715/823; 358/1.9; 358/532
(58) Field of Classification Search .................. 715/200, 715/204, 209, 226, 234, 243, 255, 273, 274, 715/731, 201, 202, 205, 207, 238, 242, 249, 715/275, 700, 746, 761, 763, 788, 823, 860; 358/1.1, 1.2, 1.6, 1.9, 2.1, 3.27, 451, 452, 358/530, 532
See application file for complete search history.

(56) References Cited

U.S. PATENT DOCUMENTS 5,914,793 A * 6/1999 Suzuki et al. .................. 358/527
(Continued)

FOREIGN PATENT DOCUMENTS

JP     H09-44128     2/1997
(Continued)

OTHER PUBLICATIONS

U.S. Appl. No. 12/754,398, M. Gotoh.
(Continued)

*Primary Examiner* — Maikhanh Nguyen
(74) *Attorney, Agent, or Firm* — George W. Neuner; Edwards Wildman Palmer LLP

(57) ABSTRACT

A display control device controls an image display device capable of displaying a preview of an output image that is to be subjected to an output process, before the output image is subjected to the output process. The display control device refers to a storage section in which specific information specifying an image process which a user cannot recognize from a previewed output image is stored, and selects an image process specified by the specific information out of image processes to be carried out on the output image. Further, the display control device causes the image display device to display a setting confirmation image showing a content of the selected image process. This allows a user to correctly understand the content of an image process to be carried out on the output image and the image quality of the output image subjected to the output process.

6 Claims, 17 Drawing Sheets

U.S. PATENT DOCUMENTS

| | | | |
|---|---|---|---|
| 6,281,983 B1 * | 8/2001 | Takahashi et al. | 358/1.2 |
| 6,970,958 B2 * | 11/2005 | Tohki | 710/72 |
| 7,453,595 B2 * | 11/2008 | Natori | 358/1.18 |
| 7,483,166 B2 * | 1/2009 | Kadoi et al. | 358/1.18 |
| 7,535,591 B2 * | 5/2009 | Kujirai | 358/1.16 |
| 7,715,657 B2 * | 5/2010 | Lin et al. | 382/298 |
| 2003/0035127 A1 | 2/2003 | Nakami | |
| 2004/0049741 A1 * | 3/2004 | Natori | 715/527 |
| 2004/0263887 A1 | 12/2004 | Kotani | |
| 2006/0098220 A1 * | 5/2006 | Oh et al. | 358/1.9 |
| 2007/0064288 A1 * | 3/2007 | Lee | 358/527 |
| 2007/0133073 A1 * | 6/2007 | Shida et al. | 358/527 |
| 2007/0140578 A1 | 6/2007 | Okutsu | |

FOREIGN PATENT DOCUMENTS

| | | |
|---|---|---|
| JP | 9-135316 | 5/1997 |
| JP | 10-126606 | 5/1998 |
| JP | 11-177740 | 7/1999 |
| JP | 2003-046797 | 2/2003 |
| JP | 2005-004656 | 1/2005 |
| JP | 2007-028336 | 2/2007 |
| JP | 2007-166456 | 6/2007 |

OTHER PUBLICATIONS

U.S. Appl. No. 12/547,557, Ohwaku, et al.

U.S. Appl. No. 12/547,624, Minami, et al.

U.S. Appl. No. 12/547,989, Gotoh.

U.S. Appl. No. 12/547,965, Gotoh, et al.

U.S. Appl. No. 12/583,803, Gotoh, et al.

Office Action mailed Nov. 21, 2011 in co-pending patent U.S. Appl. No. 12/547,624.

* cited by examiner

F I G. 2
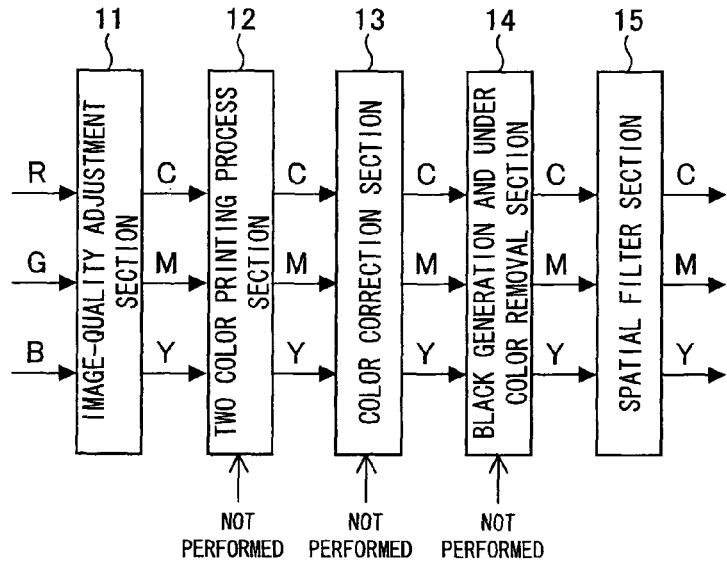
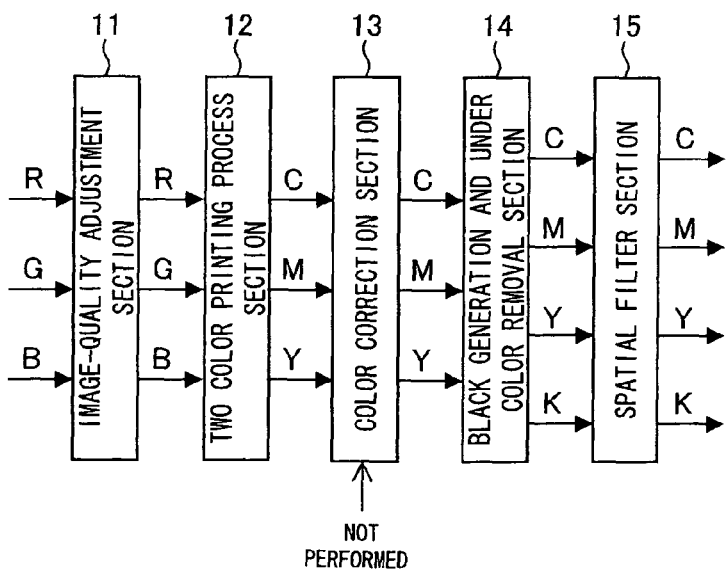

(a)

(b)

F I G. 6
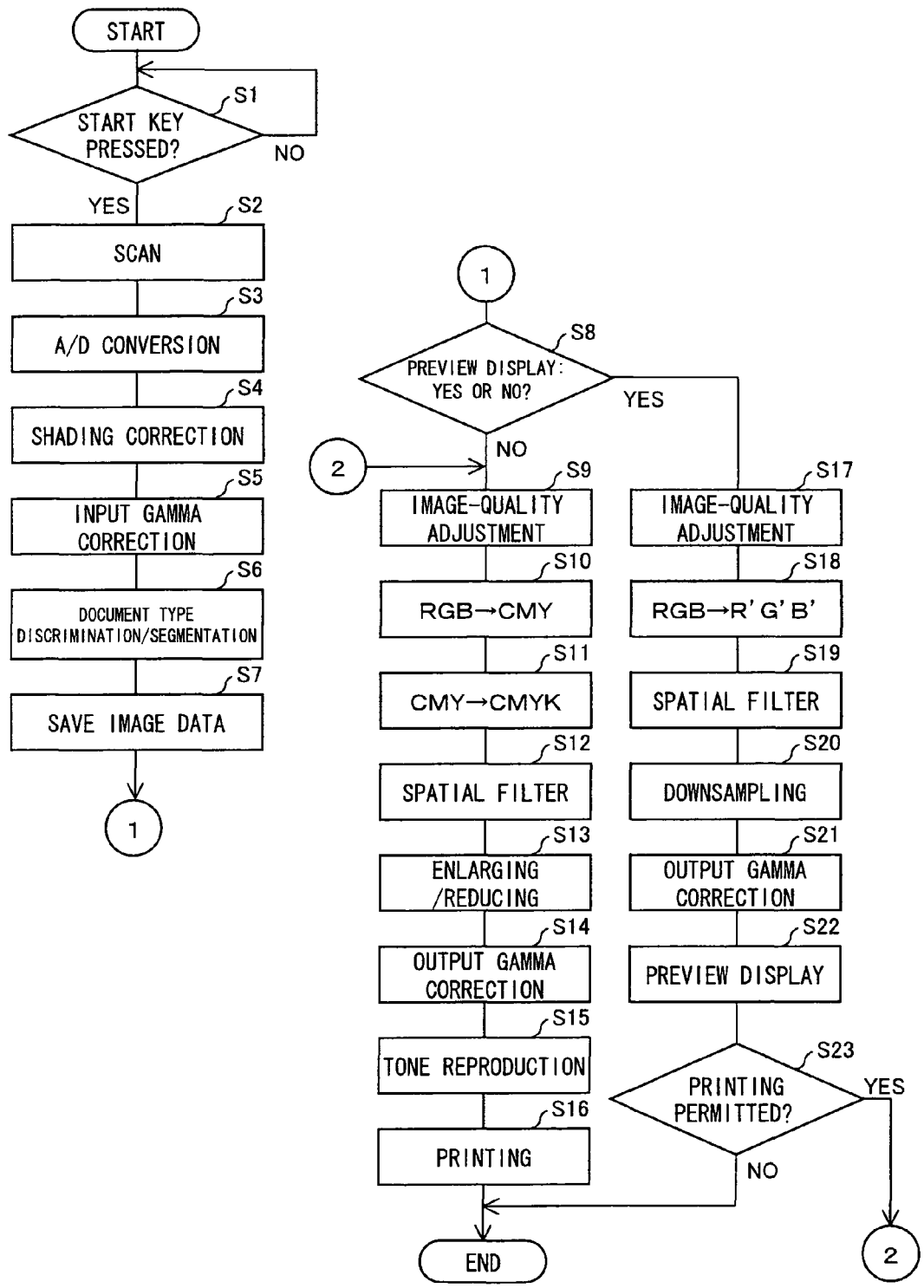

DISPLAY CONTROL DEVICE, IMAGE FORMING APPARATUS, METHOD FOR CONTROLLING DISPLAY DEVICE, AND STORAGE MEDIUM

This Nonprovisional application claims priority under 35 U.S.C. §119(a) on Patent Application No. 2008-218839 filed in Japan on Aug. 27, 2008, the entire contents of which are hereby incorporated by reference.

TECHNICAL FIELD

The present invention relates to a display controlling device for controlling a display device capable of displaying a preview image before the image is outputted (printed), an image forming apparatus, a method for controlling the display device, a control program, and a storage medium.

BACKGROUND ART

Some image forming apparatuses such as copying machines and multifunction printers carry out, with respect to image data indicative of an image to be printed, an image process according to the type of a document and setting conditions (e.g., print density, enlarging/reducing ratio, single-side printing/double-side printing, and margin size). Further, some image forming apparatuses cause a display device to display a preview of the image to be printed, before the image is printed. Preview display may be carried out in such a manner that images to be printed are displayed one page at a time or that images to be printed are displayed at once. An example of a prior art reference relating to a copying machine and a multifunction printer for preview display is Patent Literature 1 below.

Patent Literature 1 discloses a technique for generating a preview image without enhancing edges of image data. The image processing apparatus of Patent Literature 1 includes: an image editing circuit for carrying out various processes such as trimming, painting, reducing/enlarging the size, change of color balance, and color conversion; a printer for printing (outputting) an image processed by the image editing circuit; and an image display device for displaying, before printing, a preview of the image processed by the image editing circuit. A user estimates the content of an image process to be carried out on the image to be printed and the image quality of a printed image, and sets (adjusts) parameters and modes.

CITATION LIST

Patent Literature 1
Japanese Patent Application Publication, Tokukaihei, No. 9-135316 A (Publication Date: May 20, 1997)

SUMMARY OF INVENTION

Technical Problem

However, among image processes to be carried out on an image to be printed in an image forming apparatus such as a copying machine and a multifunction printer, there is an image process whose content a user cannot recognize from a preview image. Examples of such content include: a process content which cannot be reflected on a preview image and a process content which can be reflected on a preview image but whose effect cannot be discerned by a user from the preview image (e.g. sharpness described in Patent Literature 1).

Consequently, there is a case where a difference in apparent image quality etc. exists between a printed (output) image and a preview image. This causes a problem that when a user sees a preview image and estimates a content of an image process to be carried out on an image to be printed or when a user estimates image quality of a printed (output) image, the user misunderstand the content of the image process or the image quality.

The present invention was made in view of the foregoing problems. An object of the present invention is to provide a display control device for controlling a display device capable of displaying a preview of an output image that is to be subjected to an output process, before the output image is subjected to the output process, the display control device allowing a user to correctly understand the content of an image process to be carried out on the output image and the image quality of the output image subjected to the output process.

Solution to Problem

In order to solve the foregoing problem, a display control device of the present invention is a display control device for controlling a display device capable of displaying a preview of an output image that is to be subjected to an output process, before the output image is subjected to the output process, the display control device including a notification section for (i) referring to a storage section in which specific information specifying an image process which a user cannot recognize from a previewed output image is stored, (ii) selecting an image process specified by the specific information out of image processes to be carried out on the output image, and (iii) notifying a user of a content of the selected image process.

Advantageous Effects of Invention

Since the display control device of the present invention includes the notification section for notifying a user of the content of the image process which the user cannot recognize from the previewed output image, the display control device yields an effect that the user can correctly understand the content of the image process to be carried out on the output image and the image quality of the output image subjected to the output process.

For a fuller understanding of the nature and advantages of the invention, reference should be made to the ensuing detailed description taken in conjunction with the accompanying drawings.

BRIEF DESCRIPTION OF DRAWINGS

FIG. 1 is a block diagram showing an image forming apparatus of Embodiment 1 and showing the flow of image data in a printing process in a copier mode and a full-color mode.

FIG. 2

FIG. 2 shows block diagrams showing a part inside of an image processing apparatus of Embodiment 1 (a) performing a printing process in the copier mode and a single-color mode and (b) performing a printing process in the copier mode and a two-color mode.

FIG. 3 is a block diagram showing the image forming apparatus of Embodiment 1 and showing the flow of image data in a preview display process in the copier mode and the full-color mode.

FIG. 4 shows block diagrams showing a part inside of the image processing apparatus of Embodiment 1 (a) performing a preview display in the copier mode and the singe-color mode and (b) performing a preview display in the copier mode and the two-color mode.

FIG. 5 shows gamma curves, i.e., (a) an example of a gamma curve corresponding to the display characteristics of an image display device and (b) a solid line representing a gamma curve for texts to be sharply displayed and a dotted line representing a gamma curve corresponding to the display characteristics of the image display device.

FIG. 6

FIG. 6 is a flow chart showing steps of a process that is performed by the image forming apparatus in the copier mode and the full-color mode.

FIG. 7 is a block diagram showing the image forming apparatus of Embodiment 1 and showing the flow of image data in a transmission process in a facsimile transmission mode.

FIG. 8 is a block diagram showing the image forming apparatus of Embodiment 1 and showing the flow of image data in a preview display process in the facsimile transmission mode.

FIG. 9 is a block diagram showing the image forming apparatus of Embodiment 1 and showing the flow of image data in a printing process in a facsimile reception mode.

FIG. 10 is a block diagram showing the image forming apparatus of Embodiment 1 and showing the flow of image data in a preview display process in the facsimile reception mode.

FIG. 11 is a block diagram showing a modification of the image forming apparatus of Embodiment 1.

FIG. 12 is a block diagram schematically showing a configuration of an image forming apparatus of Embodiment 2.

FIG. 13 is a drawing explaining color balance adjustment.

FIG. 14 is a drawing showing an example of an initial image displayed by an image display device of Embodiment 2.

FIG. 15 is a drawing showing an example of a preview confirmation image displayed by the image display device of Embodiment 2.

FIG. 16 is a drawing showing an example of a setting confirmation image displayed by the image display device in an image transmission mode in Embodiment 2.

FIG. 17 is a flowchart showing the flow of a process in a display control device of Embodiment 2.

FIG. 18 is a drawing showing an example of a setting confirmation image displayed by the image display device in a copier mode in Embodiment 2.

DESCRIPTION OF EMBODIMENTS

Embodiment 1

Figure 1:
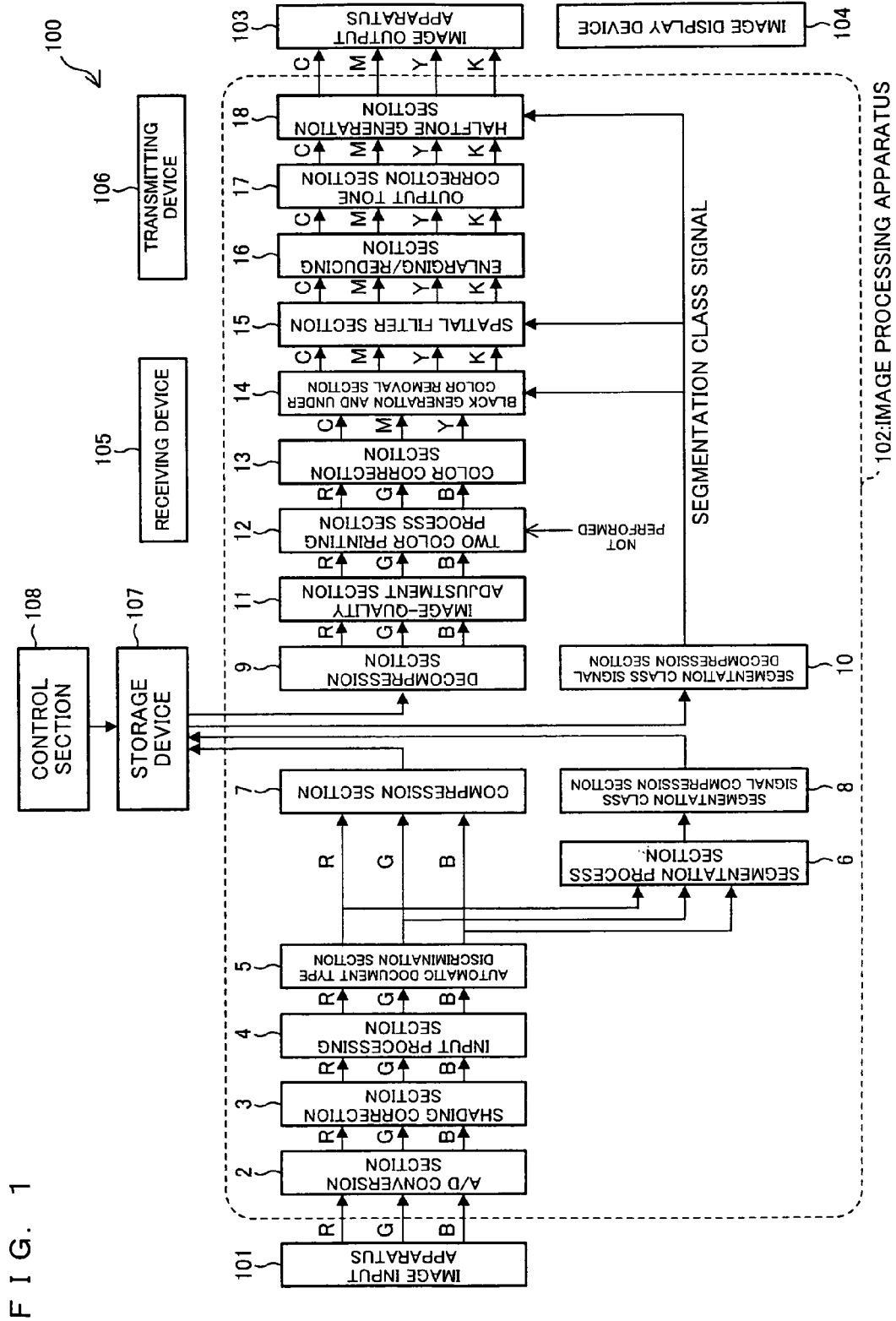
FIG. 1

One embodiment of an image forming apparatus of the present invention is described below with reference to the attached drawings. FIG. 1 is a block diagram schematically showing an arrangement of an image forming apparatus 100 of the present embodiment.

The image forming apparatus 100 of the present embodiment is a digital color multifunction printer that executes a mode selected from among a copier mode, a print mode, a facsimile transmission mode, a facsimile reception mode, and an image transmission mode.

The copier mode (copy mode) means a mode in which to read image data (generates image data by scanning a document) and print an image of the image data onto a sheet of paper. The print mode means a mode in which to print, onto a sheet of paper, an image of image data sent from a terminal apparatus connected to the image forming apparatus 100. The facsimile transmission mode means: a normal facsimile mode in which to transmit, to an external apparatus via a telephone line, image data obtained by scanning a document; and an Internet facsimile mode in which to transmit an e-mail with the image data attached thereto. The facsimile reception mode means a mode in which to receive image data from an external apparatus by facsimile and print an image of the received image data onto a sheet of paper. The image transmission mode means: (1) a mode (scan to e-mail mode) in which to attach, to an e-mail, image data generated by scanning a document, and transmit the e-mail to a specified address; (2) a mode (scan to ftp mode) in which to transmit, to a folder specified by a user, image data generated by scanning a document; and (3) a mode (scan to usb mode) in which to transmit, to a USB memory mounted in the image forming apparatus 100, image data generated by scanning a document. It should be noted that the facsimile transmission mode and the image transmission mode are each classified as above according to the type of image processing operation.

Further, in the copier mode or print mode, the user can select a black-and-white mode in which to output a black-and-white image, a full-color mode in which to output a full-color mage, a single-color mode in which to output a monochrome image having only one color desired by the user, or a two-color mode in which to output a two-color image having black and one color desired by the user.

For example, in cases where the user selects the single-color mode in the copier mode or print mode, the monochromatic image is printed. Further, in cases where the user selects the two-color mode in the copier mode or print mode, the two-color image is printed. It should be noted that in the single-color mode or two-color mode, the user selects his/her desired color from among R (red), G (green), B (blue), C (cyan), M (magenta), and Y (yellow).

Further, according to the present invention it is possible to set an automatic discrimination mode in the copier mode. In the automatic discrimination mode, the image forming apparatus 100 performs auto color selection (ACS) for judging whether an object to be copied is a color document or a black-and-white document. In the case of a color document, the image forming apparatus 100 performs an output process in the full-color mode. In the case of a black-and-white document, the image forming apparatus 100 performs an output process in the black-and-white mode.

As shown in FIG. 1, the image forming apparatus 100 includes an image input apparatus 101, an image processing apparatus 102, an image output apparatus 103, an image display device 104, a receiving device 105, a transmitting device 106, a storage device 107, and a control section 108.

The image input apparatus 101 is image scanning means for generating image data by scanning a document in the copier mode, the facsimile transmission mode, and the image transmission mode. More specifically, the image input apparatus 101, which includes a scanner section having a CCD (charge-coupled device), converts light reflected by a document into an electrical signal separated into colors RGB (i.e., into an analog image signal) and sends the electrical signal to the image processing apparatus 102.

It should be noted that the image input apparatus 101 scans a document image in full color in any one of the full-color mode, the single-color mode, and the two-color mode. Further, the image input apparatus 101 scans a document image in full color even in cases where the image processing apparatus 102 performs the aforementioned auto color selection.

The image processing apparatus 102 is an integrated circuit, constituted by an ASIC (application specific integrated circuit), which performs image processing on image data (image signals). As shown in FIG. 1, the image processing apparatus 102 includes the following blocks: an A/D (analog/digital) conversion section 2, a shading correction section 3, an input processing section 4, an automatic document type discrimination section 5, a segmentation process section 6, a compression (encode) section 7, a segmentation class signal compression (encode) section 8, a decompression (decode) section 9, a segmentation class signal decompression (decode) section 10, an image-quality adjustment section 11, a two-color printing process section 12, a color correction section 13, a black generation and under color removal section 14, a spatial filter section 15, an enlarging/reducing (zoom process) section 16, an output tone correction section 17, and a halftone generation section 18. Processes that are performed by the blocks of the image processing apparatus 102 will be detailed later.

In the copier mode, facsimile transmission mode, or image transmission mode, the image processing apparatus 102 performs image processing on image data sent from the image input apparatus 101. In the print mode, the image processing apparatus 102 performs image processing on image data transmitted from a terminal apparatus. In the facsimile reception mode, the image processing apparatus 102 performs image processing on image data received from an external apparatus. Then, in the copier mode, print mode, or facsimile reception mode, the image processing apparatus 102 transmits, to the image output apparatus 103, the image data subjected to image processing. In the facsimile transmission mode, the image processing apparatus 102 transmits, to the transmitting device 106, the image data subjected to image processing. Further, in the scan to e-mail mode, which is an image transmission mode, the image processing apparatus 102 transmits, to a mail processing section (not shown), the image data subjected to image processing. In the scan to ftp mode, which is another image transmission mode, the image processing apparatus 102 transmits, to a predetermined folder, the image data subjected to image processing. In the scan to usb mode, which is the other image transmission mode, the image processing apparatus 102 transmits, to a predetermined USB memory, the image data subjected to image processing.

The image output apparatus (printer) 103 forms, onto a recording medium (e.g., a sheet of paper), an image of image data sent from the image processing apparatus 102. An example is an electrophotographic or ink-jet color printer. The term "printing" in the present embodiment means printing in the print mode, printing in the copier mode, or printing in the facsimile reception mode.

The image display device 104 is a liquid crystal display provided in an operation panel (not shown) of the image forming apparatus 100, and is display means capable of displaying a color image. Further, the image display device 104, covered with a touch panel, functions as an input interface of the image forming apparatus 100. That is, the image display device 104 displays a GUI for inputting various commands to the image forming apparatus 100 and an operation guide.

Further, before execution of printing in the copier mode or facsimile reception mode, the image forming apparatus 100 of the present embodiment can display, on the image display device 104, a preview of an image to be printed. Furthermore, before execution of transmission in the facsimile transmission mode or image transmission mode, the image forming apparatus 100 of the present embodiment can display, on the image display device 104, a preview of an image to be transmitted.

Further, in the copier mode or image transmission mode and the full-color mode, the image display device 104 displays a preview of a full-color image. In the copier mode or image transmission mode and the single-color mode, the image display device 104 displays a preview of a monochrome image. In the copier mode or image transmission mode and the two-color mode, the image display device 104 displays a preview of a two-color image.

The image display device 104 is not limited to the liquid crystal display, and may be display means other than the liquid crystal display (e.g., an organic EL display or a plasma display).

The receiving device 105 is a device, connected to a telephone line or the Internet, which receives image data from an external apparatus by facsimile communication. Further, the transmitting device 106 is a device, connected to a telephone line or the Internet, which transmits, to an external apparatus by facsimile communication, image data inputted to the image input apparatus 101.

The storage device 107 is a hard disk in which image data to be processed in the image processing apparatus 102 is temporarily stored.

The control section 108 is a computer including a processor such as a CPU (central processing unit) or a DSP (digital signal processor), and comprehensively controls various types of hardware provided in the image forming apparatus 100. Further, the control section 108 functions to control data transfer between pieces of hardware provided in the image forming apparatus 100.

The following details the processes that are executed by the blocks of the image processing apparatus 102 in the copier mode, the facsimile transmission mode, the facsimile reception mode, and the image transmission mode, respectively. It should be noted that the image processing apparatus 102 of the present embodiment has a block that operates while a mode a is being used but does not operate while a mode b different from the mode a is being used (the mode a and the mode b each being any one of the copier mode, the facsimile transmission mode, the facsimile reception mode, and the image transmission mode). Further, the image processing apparatus 102 has a block that varies in processing according to the mode being used. Furthermore, the image processing apparatus 102 has: a block that, even in the same mode, operates in processing of image data to be printed (transmitted) but does not operate in processing of image data to be previewed; and a block that, even in the same mode, varies between processing of image data to be printed (transmitted) and processing of image data to be previewed. In the following, therefore, the processes that are executed by the blocks of the image processing apparatus 102 are described according to the type of mode, and those processes which are executed in a printing process (or in a transmission process) and those processes which are executed at the time of a preview display are described separately.

(1) Copier Mode
(1-1) Printing Process (Image Print Job)

In the following, the image processing apparatus 102 is described with reference to FIG. 1, which shows the flow of image data in the image processing apparatus 102 performing a printing process in the copier mode and the full-color mode.

The A/D (analog/digital) conversion section 2 is a block that receives color image signals (RGB analog signals) from the image input apparatus 101 and converts the color image signals into digital image data (RGB digital signals). The shading correction section 3 is a block that receives image data form the A/D conversion section 2 and subjects the image data to a process of removing various distortions generated in illuminating, image-focusing, and image-sensing systems of the image input apparatus 101. The input processing section 4 is a block that receives RGB image data from the shading correction section 3 and subjects each of the RGB image data to a tone conversion process such as a gamma correction process.

In accordance with RGB image data (RGB density signals) subjected to processing such as gamma correction in the input processing section 4, the automatic document type discrimination section 5 discriminates among types of documents scanned by the image input apparatus 101. It should be noted here that the types of documents among which the automatic document type discrimination section 5 discriminates are a text document, a printed-picture document, a text/printed-picture document containing a text and a printed picture together, and the like. Further, in accordance with the image data, the automatic document type discrimination section 5 can perform auto color selection (ACS) for judging whether a scanned document is a color document or a black-and-white document and a process for judging whether or not a scanned document is a blank document (a solid-color document). It should be noted that the automatic document type discrimination section 5 sends the RGB image data to the segmentation process section 6 and the compression section 7.

In accordance with the RGB image data sent from the automatic document type discrimination section 5, the segmentation process section 6 performs a process of judging, for each pixel of the input image, what image area the pixel is classified into and generating a segmentation class signal indicating a result of the judgment. It should be noted here that the types of image areas among which the segmentation process section 6 discriminates are a black text area, a color text area, a halftone dot area, and the like. The segmentation process may take the form of a process of judging, for each block of pixels, what image area the block is classified into, instead of taking the form of a process of judging, for each pixel, what image area the pixel is classified into.

The compression section 7 is a block that performs a process of encoding image data (RGB signals) sent from the automatic document type discrimination section 5. The encoding is performed, for example, based on JPEG (Joint Photographic Experts Group).

The segmentation class signal compression section 8 is a block that performs a compression (encode) process on a segmentation class signal generated for each pixel. The compression process in the segmentation class signal compression section 8 is performed, for example, based on MMR (Modified Modified Reed) or MR (Modified Reed), which is a lossless compression technology.

The control section 108 receives encoded codes (encoded image data) from the compression section 7 and segmentation class signal codes (encoded segmentation class signals) from the segmentation class signal compression section 8, stores them temporarily in the storage device 107, and manages them as filing data. Then, in response to an instruction for a copy output operation, the control section 108 reads out, from the storage device 107, an encoded code and a segmentation class signal code corresponding to the encoded code, and sends them to the decompression section 9 and the segmentation class signal decompression section 10, respectively.

The control section 108 writes the storage address or data name of the encoded code and the storage address of the segmentation class signal code in a management table in association with each other. That is, the control section 108 controls reading or writing of encoded codes and segmentation class signal codes with reference to the management table.

The decompression section 9 decompresses the encoded code into RGB image data by performing a decompression (decode) process on the encoded code. Further, the segmentation class signal decompression section 10 performs a decompression process on the segmentation class signal code. The resulting segmentation class signal is sent to the black generation and under color removal section 14, the spatial filter section 15, and the halftone generation section 18. Then, the black generation and under color removal section 14, the spatial filter section 15, and the halftone generation section 18 select image processing according to the type of image area.

The image-quality adjustment section 11 receives the RGB image data from the decompression section 9, and performs background removal correction on the RGB image data by detecting a background in the RGB image data. Furthermore, the image-quality adjustment section 11 adjusts RGB balance (color adjustment of red, green, or blue), brightness, and intensity (saturation) in accordance with configuration information inputted by the user from the operation panel (not shown).

Furthermore, in the single-color mode, the image-quality adjustment section 11 converts the RGB image data into CMY image data complementary to the RGB image data. It should be noted here that the conversion of the RGB data into the CMY image data in the single-color mode is executed by using Eq. (1) below, where the coefficients r1 to r3 are defined based on [Table 1]. For example, in cases where the user selects cyan as his/her desired color in the single-color mode, the values of r1 to r3 in the column "Cyan" are referred to, with the result that r1=1, r2=0, and r3=0 are selected.

$$\begin{pmatrix} C \\ M \\ Y \end{pmatrix} = \begin{pmatrix} r1 \cdot a1 & r1 \cdot a2 & r1 \cdot a3 \\ r2 \cdot a1 & r2 \cdot a2 & r2 \cdot a3 \\ r3 \cdot a1 & r3 \cdot a2 & r3 \cdot a3 \end{pmatrix} \times \begin{pmatrix} R \\ G \\ B \end{pmatrix} + \begin{pmatrix} r1 \cdot c \\ r2 \cdot c \\ r3 \cdot c \end{pmatrix} \quad \text{Eq. (1)}$$

$a1 = -0.23046875$ $a2 = -0.79296875$ $a3 = 0.0234375$ $c = 255$

TABLE 1

| Adjustment Plane | Output Color (Single Color) | | | | | |
|---|---|---|---|---|---|---|
| | Red | Green | Blue | Cyan | Magenta | Yellow |
| r1 | 0 | 1 | 1 | 1 | 0 | 0 |
| r2 | 1 | 0 | 1 | 0 | 1 | 0 |
| r3 | 1 | 1 | 0 | 0 | 0 | 1 |

That is, whereas the output from the image-quality adjustment section 11 in the full-color mode is RGB image data as shown in FIG. 1, the output from the image-quality adjustment section 11 in the single-color mode is CMY image data as shown in (a) of FIG. 2. It should be noted that the output from the image-quality adjustment section 11 in the two-color mode is RGB image data as shown in (b) of FIG. 2. (a) of FIG. 2 shows some of the blocks of the image processing apparatus 102 performing a printing process in the copier mode and the single-color mode, and (b) of FIG. 2 shows some of the blocks of the image processing apparatus 102 performing a printing process in the copier mode and the two-color mode.

Further, the adjustment of intensity by the image-quality adjustment section 11 can be realized by using the matrix of Eq. (1) after varying the values of r1 to r3 and a1 to a3 of the matrix. This makes it possible to use the same matrix and the same image processing circuit for the adjustment of intensity and the conversion of image data (from RGB into CMY) in the single-color mode. Therefore, in the present embodiment, the adjustment of intensity and the conversion of image data in the single-color mode are performed by the same processing section (image-quality adjustment section 11).

The two-color printing process section 12 is a block that, in the two color mode, receives RGB image data from the image-quality adjustment section 11 and converts the RGB image into CMY image data as shown in (b) of FIG. 2. The conversion of the RGB image data into the CMY image data in the two-color mode can be realized, for example, by a technique of [Embodiment 1] or [Embodiment 2] described in Japanese Patent Application Publication, Tokukai, No. 2007-28336 A.

Further, in the full-color mode, as shown in FIG. 1, the two-color printing process section 12 performs no processing on the image data sent from the image-quality adjustment section 11 and passes the image data directly on to the color correction section 13. Furthermore, in the single-color mode, as shown in (a) of FIG. 2, two-color printing process section 12 performs no processing on the CMY image data sent from the image-quality adjustment section 11 and passes the image data directly on to the color correction section 13.

The color correction section 13 is a block that, in the full-color mode, receives RGB image data from the two-color printing process section 12, performs a color correction process of converting the RGB image data into CMY image data, and performs a process of improving the color reproducibility of the image data. The color correction process is realized by creating an LUT (look-up table) of input values (RGB) and output values (CMY) associated with one another and looking up the output values in the created LUT.

Further, in the single-color mode or two-color mode, as shown in FIG. 2, the color correction section 13 performs no processing on the CMY image data sent from the two-color printing process section 12 and passes the image data directly on to the black generation and under color removal section 14.

The black generation and under color removal section 14 is a block that, in the full-color mode or two-color mode, receives CMY image data from the color correction section 13, generates black (K) image data from the CMY image data, and generate new CMY image data by subtracting the black (K) image data from the original CMY image data. Thus, in the full-color mode or two-color mode, as shown in FIG. 1 or (b) of FIG. 2, the black generation and under color removal section 14 converts the CMY image data into four colors of image data CMYK.

Further, in the single-color mode, as shown in (a) of FIG. 2, the black generation and under color removal section 14 performs no processing on the CMY image data sent from the color correction section 13 and passes the image data directly on to the subsequent spatial filter section 15.

In the full-color mode or two-color mode, the output from the black generation and under color removal section 14 and the input to and output from each block subsequent to the black generation and under color removal section 14 are CMYK image data as shown in FIG. 1. Meanwhile, in the single-color mode, the output from the black generation and under color removal section 14 and the input to and output from each block subsequent to the black generation and under color removal section 14 are CMY image data unlike in FIG. 1.

The spatial filter section 15 receives the CMYK or CMY image data from the black generation and under color removal section 14 and performs a spatial filter process (e.g., edge enhancement process, smoothing process) on the image data by a digital filter in accordance with the segmentation class signals. That is, the spatial filter section 15 executes image processing differently for each image area in accordance with the segmentation class signals.

The enlarging/reducing section 16 is a block that enlarges or reduces an image in accordance with an enlarging/reducing command (information indicating the zoom ratio of a printed image) inputted by the user from the operation panel (not shown).

The output tone correction section 17 is a block that receives image data from the enlarging/reducing section 16 and performs output gamma correction for outputting the image data onto a recording medium such as a sheet of paper. The halftone generation section 18 executes, by dithering or error diffusion, a tone reproduction process (halftone generation process) necessary for the image output apparatus 103 to print an image.

Then, the halftone generation section 18 passes the CMYK or CMY image data on to the image output apparatus 103, and the image output apparatus 103 prints an image of the image data onto a recording medium (e.g., a sheet of paper).

(1-2) Preview Display

Figure 3:
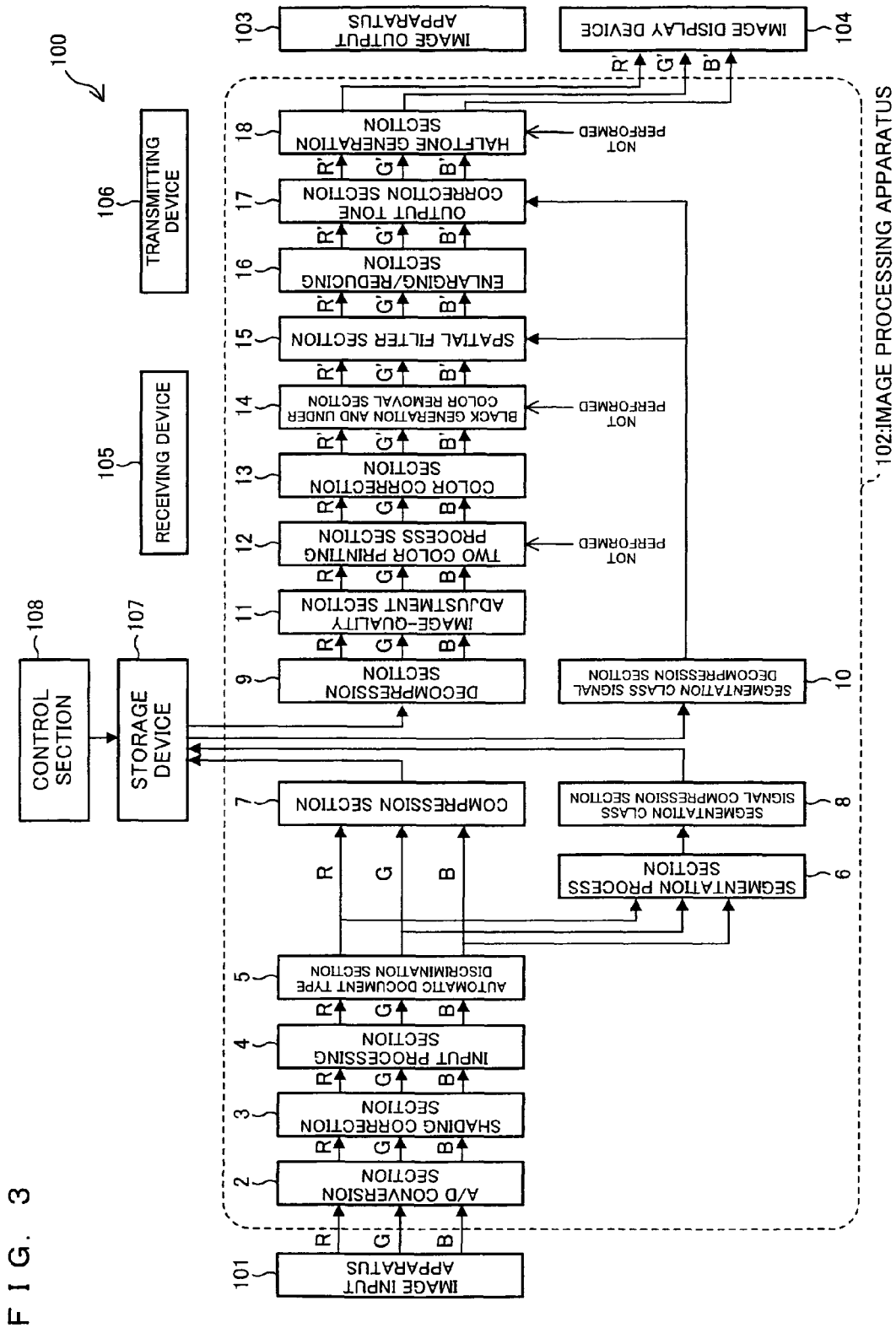
FIG. 3

Next, the processes that are executed by the blocks of the image processing apparatus 102 in cases where a preview of an image to be printed is displayed in the copier mode are described with reference to FIG. 3. FIG. 3 is a block diagram showing the same image forming apparatus 100 as in FIG. 1 and showing the flow of image data at the time of a preview display process in the copier mode and the full-color mode.

It should be noted that because the A/D (analog/digital) conversion section 2, the shading correction section 3, the input processing section 4, the automatic document type discrimination section 5, the segmentation process section 6, the compression section 7, the segmentation class signal compression section 8, the decompression section 9, the image-quality adjustment section 11, and the two-color printing process section 12 perform the same processes as in the case of a printing process, such processes will not be described below.

At the time of a preview display, as shown in FIG. 3, the segmentation class signal decompression section 10 decompresses (decodes) segmentation class signals and passes them on to the spatial filter section 15 and the output tone correction section 17.

In the full-color mode, the color correction section 13 receives RGB image data in color space of the scanner (image input apparatus 101). Then, the color correction section 13 converts the RGB image data into R'G'B' image data in color space of the image display device 104.

That is, the color correction section 13 converts the RGB image data, which conform to the image scanning characteristics of the scanner, into the R'G'B' image data, which conform to the display characteristics of the display device. It should be noted that the conversion of the RGB image data into the R'G'B' image data is also realized by creating an LUT (look-up table) of input values (RGB) and output values (R'G'B') associated with one another and looking up the output values in the created LUT.

Moreover, in the full-color mode, the present embodiment uses the same image processing circuit for the conversion of RGB image data into CMYK image data at the time of a printing process and the conversion of RGB image data into R'G'B' image data at the time of a preview display.

Figure 4:
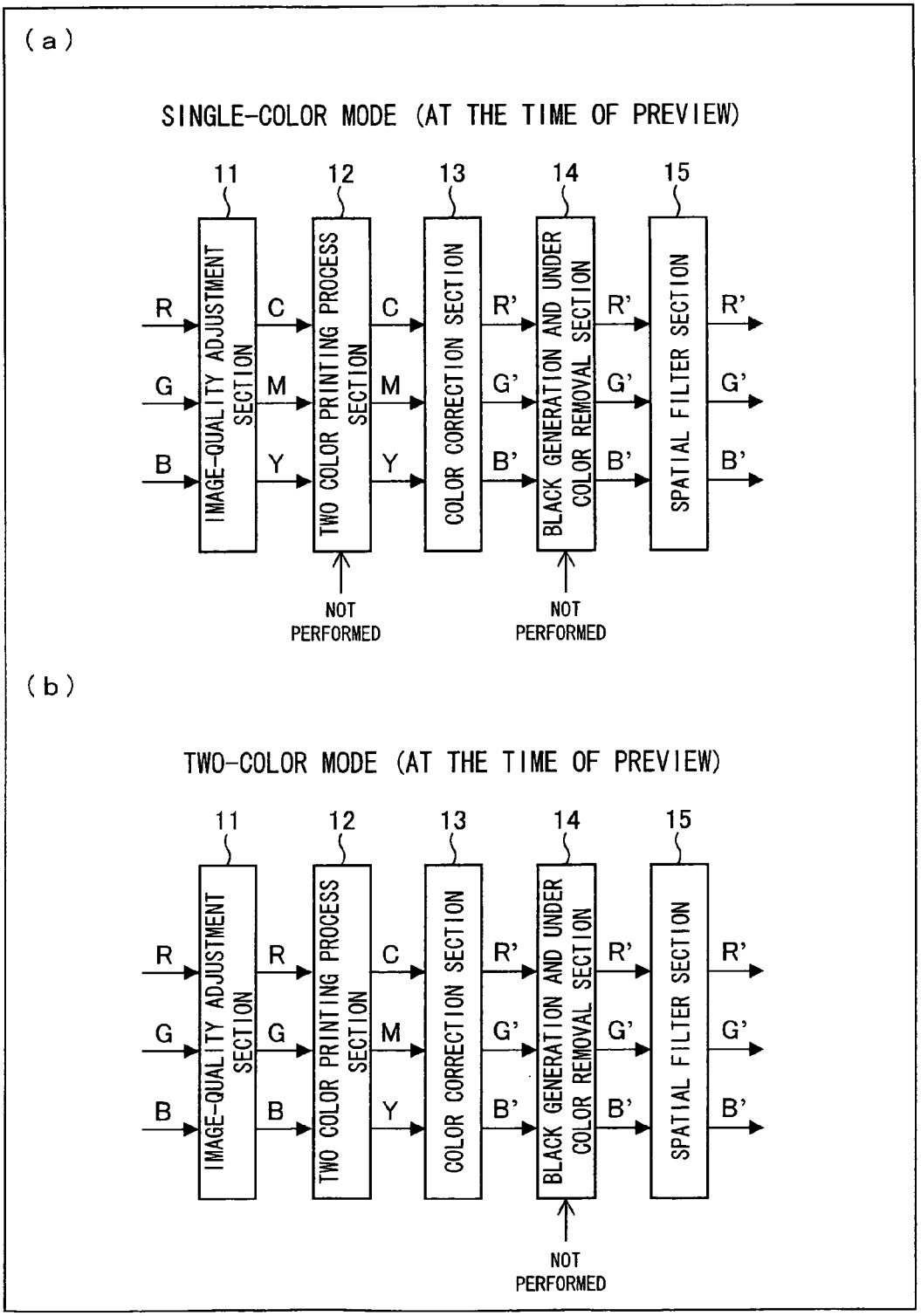
FIG. 4

As with FIG. 1, FIG. 3 shows the image forming apparatus 100 in the full-color mode. In the full-color mode, the color correction section 13 receives RGB image data. Meanwhile, in the single-color mode or two-color mode, as shown in FIG. 4, the color correction section 13 receives CMY image data. (a) of FIG. 4 shows some blocks of the image processing apparatus 2 performing a preview display in the copier mode and the singe-color mode, and (b) of FIG. 4 shows some blocks of the image processing apparatus performing a preview display in the copier mode and the two-color mode.

Then, in the single-color mode or two-color mode, the color correction section 13 converts the CMY image data into R'G'B' image data. That is, the color correction section 13 converts the CMY image data, which conform to the printing characteristics of the printing process, into the R'G'B' image data, which conform to the display characteristics of the display device. It should be noted that the conversion of the CMY image data into the R'G'B' image data is also realized by creating an LUT (look-up table) of input values (RGB) and output values (R'G'B') associated with one another and looking up the output values in the created LUT.

In any one of the single-color mode, the two-color mode, and the full-color mode, as shown in FIGS. 3 and 4, the black generation and under color removal section 14 performs no processing on the R'G'B' image data sent from the color correction section 13 and passes the image data directly on to the subsequent spatial filter section 15.

The spatial filter section 15 receives the R'G'B' image data from the black generation and under color removal section 14 and performs a spatial filter process (e.g., edge enhancement process, smoothing process) on the image data by a digital filter in accordance with the segmentation class signals. That is, as in the case of a printing process, the spatial filter section 15 executes image processing differently for each image area in accordance with the segmentation class signals.

The enlarging/reducing section 16 performs a downsampling process by which the number of pixels of an image composed of the R'G'B' image data sent from the spatial filter section 15 is converted into the number of pixels of the image display device 104 (process by which the number of pixels is reduced). The image display device 104, provided in the operation panel of the image forming apparatus 100, is lower in resolution than image data to be printed and, usually, is an extremely small display. Therefore, at the time of a preview display, it is necessary to downsample the image data. Further, the enlarging/reducing section 16 enlarges or reduces the image in accordance with an enlarging/reducing command (information indicating the zoom ratio of a display, e.g., a fixed zoom ratio of 2 to 4 times) inputted from the operation panel (not illustrated) provided in the image forming apparatus.

Figure 5:
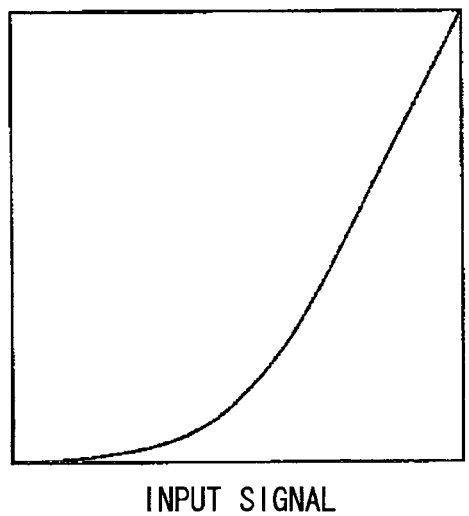
FIG. 5
Figure 5:
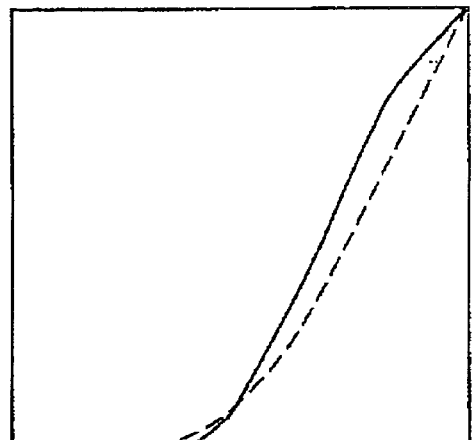

The output tone correction section 17 receives the image data from the enlarging/reducing section 16 and performs output gamma correction on the image data in accordance with the segmentation class signals. More specifically, in accordance with the segmentation class signals, the output tone correction section 17 selects different gamma curves for different image areas and varies in output gamma correction from one image area to another. For example, for nontext areas, the output tone correction section 17 selects a gamma curve corresponding to the display characteristics of the image display device 104, and for text areas, selects a gamma curve for texts to be sharply displayed. (a) of FIG. 5 shows a gamma curve corresponding to the display characteristics of the image display device 104, and (b) of FIG. 5 shows a solid line representing a gamma curve for texts to be sharply displayed and a dotted line representing a gamma curve corresponding to the display characteristics of the image display device 14. The dotted line is shown for comparison with the gamma curve for texts to be sharply displayed.

In the present embodiment, the output tone correction section 17 selects between the gamma curves in accordance with the segmentation class signals. However, the output tone correction section 17 may perform output tone correction by using only the gamma curve of (a) of FIG. 5, instead of making selection in accordance with the segmentation class signals.

Then, the halftone generation section 18 performs no processing on the R'G'B' image data sent from the output tone correction section 17 and passes the image data directly on to the subsequent image display device 104. This allows the image display device 104 to display, in accordance with the R'G'B' image data, a preview of an image to be copied.

It should be noted that in place of the output tone correction section 17, the image-quality adjustment section 11 may execute output gamma correction.

(1-3) As to Whether The Blocks Operate or Do Not Operate

As described above, at the time of printing in the full-color mode, the image-quality adjustment section 11 through the halftone generation section 18 all operate except for the two-color printing process section 12 (see FIG. 1). Meanwhile, at the time of a preview display in the full-color mode, the image-quality adjustment section 11 through the halftone generation section 18 all operate except for the two-color printing process section 12, the black generation and under color removal section 14, and the halftone generation section 18 (see FIG. 3).

Further, at the time of printing in the two-color mode, the image-quality adjustment section 11 through the halftone generation section 18 all operate except for the color correction section 13 (see (b) of FIG. 2). Meanwhile, at the time of a preview display in the two-color mode, the image-quality adjustment section 11 through the halftone generation section 18 all operate except for the black generation and under color removal section 14 and the halftone generation section 18 (see (b) of FIG. 4).

Furthermore, at the time of printing in the single-color mode, the image-quality adjustment section 11 through the halftone generation section 18 all operate except for the two-color printing process section 12, the color correction section 13, and the black generation and under color removal section 14 (see (a) of FIG. 2). Meanwhile, at the time of a preview display in the single-color mode, the image-quality adjustment section 11 through the halftone generation section 18 all operate except for the two-color printing process section 12, the black generation and under color removal section 14, and the halftone generation section 18 (see (a) of FIG. 4).

(1-4) Steps of a Process

Next, an example of steps of a process in the copier mode and the full-color mode is described with reference to FIG. 6.

FIG. 6 is a flow chart showing an example of steps of a process that is performed by the image forming apparatus in the copier mode and the full-color mode.

In response to a pressing of a start key (YES in S1) in the copier mode, the image forming apparatus 100 generates RGB analog signals by scanning a document (S2). It is assumed here that prior to the pressing of the start key in S1, the user inputs setting information indicating whether or not a preview display is necessary and thereby sets whether or not the image forming apparatus 100 performs a preview display.

After S2, the image forming apparatus 100 converts the RGB analog signals into RGB image data (digital data) (S3), subjects the RGB image data to shading correction (S4), and then subjects the RGB image data to input gamma correction (S5). After S5, the image forming apparatus 100 performs a document type discrimination process and a segmentation process in accordance with the RGB image data (S6), and then stores the RGB image in the storage device 107 (S7).

After S7, the image forming apparatus 100 judges whether or not it has been set to "Preview Display: Yes" (S8). In cases where it has not been set to "Preview Display: Yes", the image forming apparatus 100 executes Steps S9 through S16. In cases where it has been set to "Preview Display: Yes", the image forming apparatus 100 executes Steps S17 through S23. In the following, Steps S9 through S16 are described first, and then Steps S17 through S23 are described.

In cases where the image forming apparatus 100 has not been set to "Preview Display: Yes" (NO in S8), the image forming apparatus 100 reads out the RGB image data from the storage device 107, and then performs an image-quality adjustment process such as background removal correction and adjustment of intensity (S9). After that, the image forming apparatus 100 converts the RGB image data, which conforms to the characteristics of the scanner, into CMY image data conforming to the characteristics of the printer (S10), and then converts the CMY image data into CMYK image data (S11). After that, the image forming apparatus 100 performs a spatial filter process on the CMYK image data in accordance with a result of the segmentation process (S12), and then performs an enlarging/reducing process on the CMYK image data (S13). After S13, the image forming apparatus 100 performs output gamma correction and a tone reproduction process on the CMYK image data (S14, S15), prints an image of the image data on a sheet of paper (S16), and then finishes the process.

In cases where the image forming apparatus 100 judges, in S8, that it has been set to "Preview Display: Yes" (YES in S8), the image forming apparatus 100 reads out the RGB image data from the storage device 107, and then performs the same image-quality adjustment process as in S9 (S17). After that, the image forming apparatus 100 converts the RGB image data, which conforms to the characteristics of the scanner, into R'G'B' image data conforming to the characteristics of the display device (S18). After S18, the image forming apparatus 100 performs a spatial filter process on the R'G'B' image data in accordance with a result of the segmentation process (S19), and then performs a downsampling process on the R'G'B' image data so that the R'G'B' image data conforms to the resolution and size of the display (S20). After S20, the image forming apparatus 100 performs output gamma correction on the R'G'B' image data in accordance with the result of the segmentation process (S21). After S21, the image forming apparatus 100 performs a preview display in accordance with the R'G'B' image data (S22). Then, after S22, upon receiving, from the user, a command indicating permission of printing (YES in S23), the image forming apparatus 100 again reads out the RGB image data from the storage device 107, and then performs printing by executing Steps S9 through S16 in accordance with the image data. On the other hand, after S22, upon receiving, from the user, a command indicating cancellation of printing (NO in S23), the image forming apparatus 100 finishes the process.

(2) Facsimile Transmission Mode (2-1) Transmission Process (Image Transmission Job)

Figure 7:
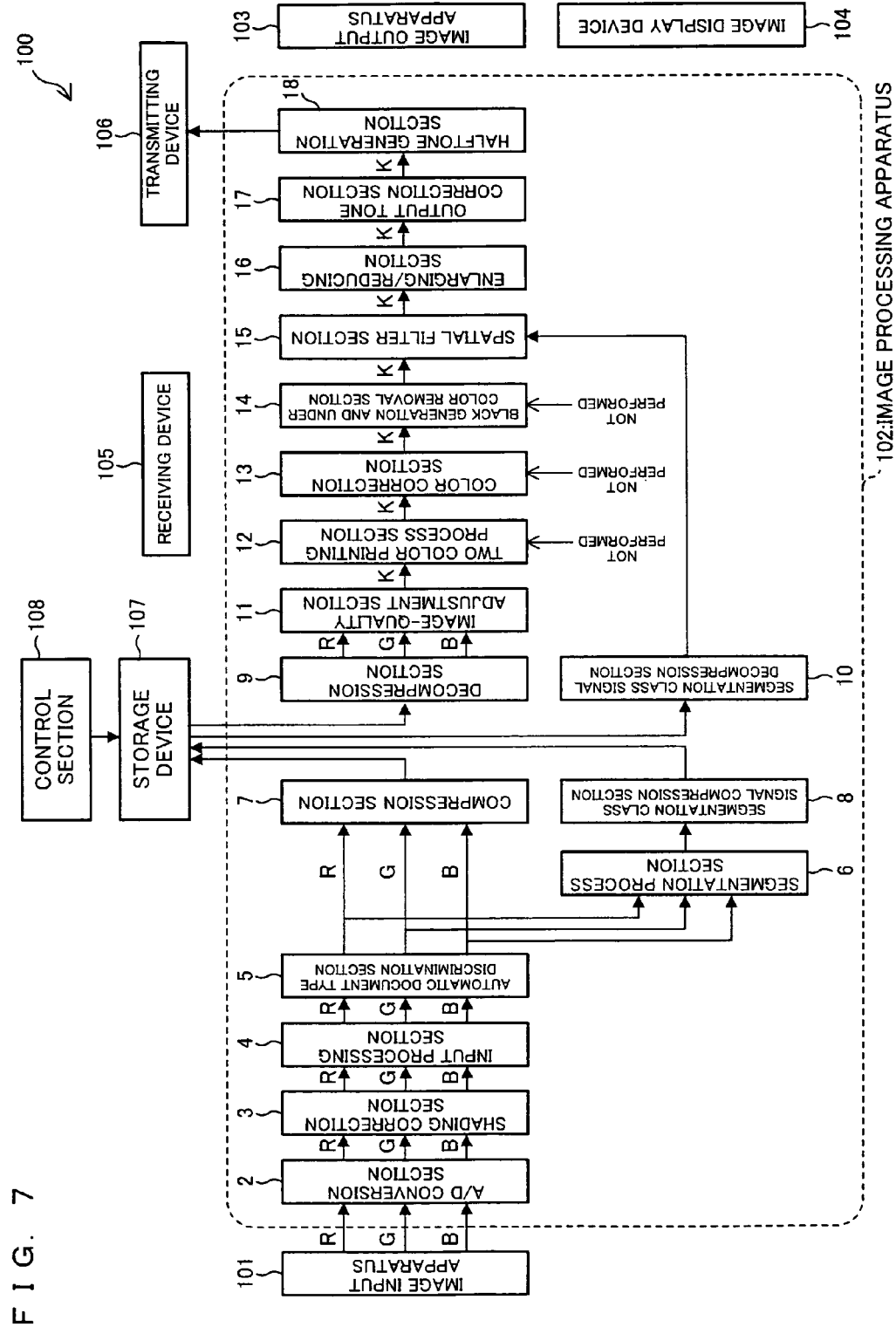
FIG. 7

FIG. 7 is a block diagram showing the same image forming apparatus 100 as in FIG. 1 and showing the flow of image data in a transmission process in the facsimile transmission mode. It should be noted that because the A/D (analog/digital) conversion section 2, the shading process section 3, the input processing section 4, the automatic document type discrimination section 5, the segmentation process section 6, the compression section 7, the segmentation class signal compression section 8, and the decompression section 9 performs the same processes as in the case of the copier mode, such processes will not be described below.

In the facsimile transmission mode, the segmentation class signal decompression section 10 reads out the segmentation class signal codes from the storage device 107, decompresses the segmentation class signal codes, and then transmits the decompressed (decoded) segmentation class signal codes to the spatial filter section 15.

The image-quality adjustment section 11 receives the RGB image data from the decompression section 9 and converts the RGB image into K image data (a value indicating grayscale). It should be noted that this conversion is performed by using a predetermined matrix of coefficients and Eq. (2) below:

$$\text{Luminance (Value of } K \text{ Image Data)} = 0.299r + 0.587g + 0.114b \qquad \text{Eq. (2)}$$

where r is the value (density) of red image data, g is the value of green image data, and b is the value of blue image data.

The two-color printing process section 12, the color correction section 13, and the black generation and under color removal section 14 perform no processing on the K image data (signal) sent from the image-quality adjustment section 11 and pass the K image data directly on to the subsequent spatial filter section 15.

The spatial filter section 15 performs a spatial filter process (e.g., edge enhancement process, smoothing process) on the K image data by a digital filter in accordance with the segmentation class signals. The enlarging/reducing section 16 performs an enlarging/reducing process on the K image data in accordance with the transmission resolution. The output tone correction section 17 performs output gamma correction (gamma correction for output onto a recording medium such as a sheet of paper) on the K image data sent from the enlarging/reducing section 16. The halftone generation section 18 converts the K image data into binarized image data, for example, by error diffusion. Then, the binarized image data are rotated by a rotation process section (not shown) as needed, compressed by a compression/decompression section (not shown) into a predetermined form, and then stored in a memory (not shown).

After that, the transmitting device (e.g., modem) 106 performs a procedure for transmission to the destination and ensures transmittability to the destination. Then, the transmitting device 106 reads out the binarized image data, stored in the memory, with the binarized image data compressed in the predetermined form, subjects the binarized image data to necessary processes such as a conversion in compression format, and then transmits the binarized image data in sequence via a communication line.

(2-2) Preview Display

Figure 8:
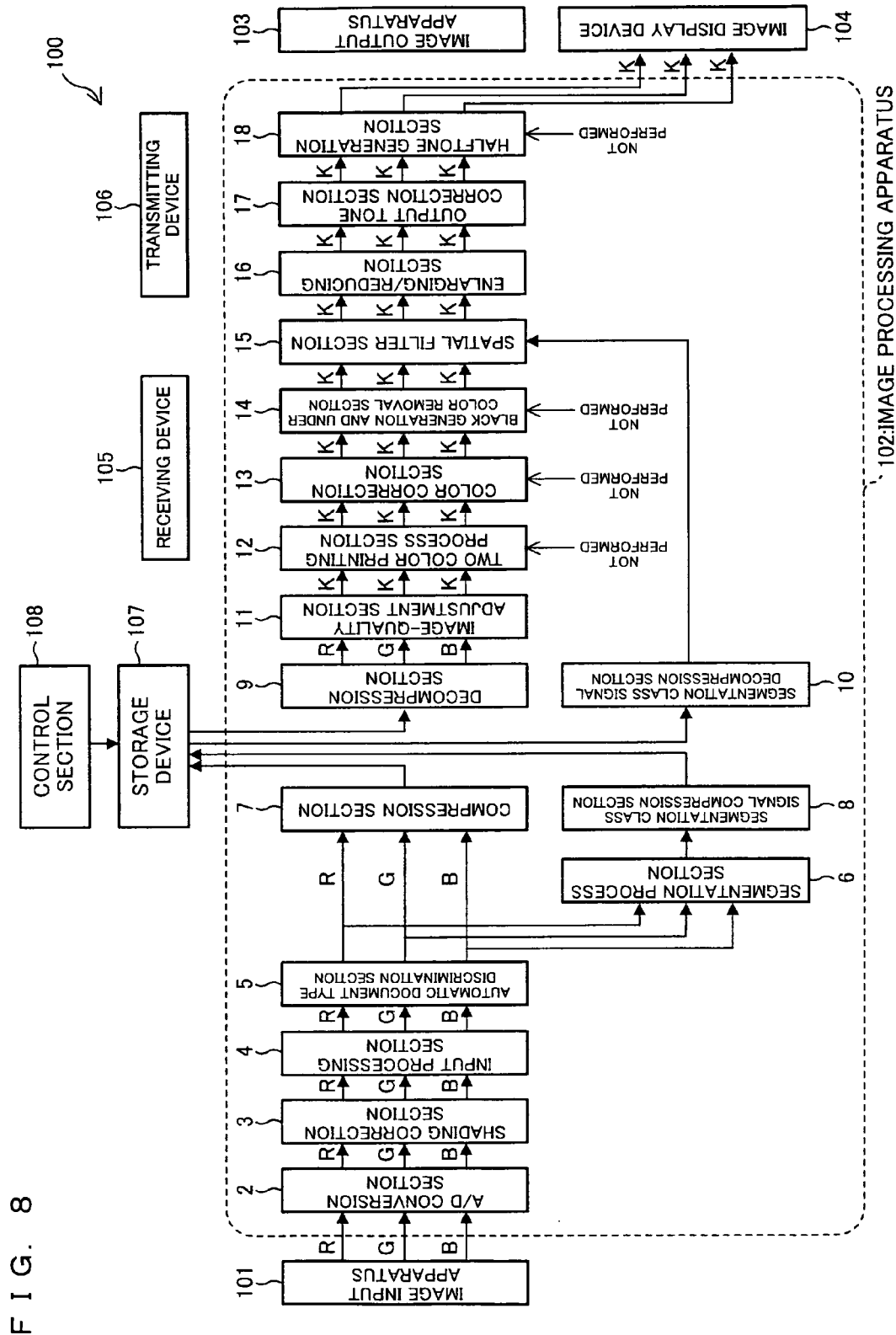
FIG. 8

FIG. 8 is a block diagram showing the same image forming apparatus 100 as in FIG. 1 and showing the flow of image data in a preview display process in the facsimile transmission mode. The term "preview display in the facsimile transmission mode" here means a process of displaying a preview of an image to be transmitted by facsimile.

At the time of a preview display, the A/D conversion section 2, the shading correction section 3, the input processing section 4, the automatic document type discrimination section 5, the segmentation process section 6. the compression section 7, the segmentation class signal compression section 8, the decompression section 9, the segmentation class signal decompression section 10, the image-quality adjustment section 11, and the spatial filter section 15 perform the same processes as in the case of a facsimile transmission process; therefore, such processes are not described. Further, as in the case of a facsimile transmission process, the two-color printing process section 12, the color correction section 13, and the black generation and under color removal section 14 do not perform any processes.

However, at the time of a preview display, unlike in the case of a transmission process, as shown in FIG. 8, three pieces of K image data (all being equal in value) are transmitted for each pixel all the way from the image-quality adjustment section 11 to the image display device 104. This is because the image display device 104 is a full-color model and as such requires three values (pieces of image data) for one pixel.

The enlarging/reducing section 16 performs a downsampling process on the K image data so that the number of pixels of an image composed of the K image data sent from the spatial filter section 15 conforms to the number of pixels of the display size of the image display device 104. Further, the enlarging/reducing section 16 enlarges or reduces the image in accordance with an enlarging/reducing command (information indication the zoom ratio of a display, e.g., a fixed zoom ratio of 2 to 4 times) inputted from the operation panel (not shown) provided in the image forming apparatus 100.

The output tone correction section 17 receives the K image data from the enlarging/reducing section 16 and performs gamma correction on the K image data in conformity to the display characteristics of the image display device 104. Then, the halftone generation section 18 performs no processing on the K image data sent from the output tone correction section 17 and passes the K image data directly on to the subsequence image display device 104. This allows the image display device 104 to display, in accordance with the K image data, a preview of an image to be transmitted by facsimile.

Further, at the time of a preview display process in the facsimile transmission mode, the image-quality adjustment section 11 converts the RGB image data into three pieces of K image data. However, there is no such limitation in embodiment. For example, it is possible to perform image processing without converting RGB image data into K image data up to the output tone correction section 17, to receive the RGB image data from the output tone correction section 17, and to convert the RGB image data into K image data by a browser.

(2-3) As to Whether The Blocks Operate or Do Not Operate

As described above, at the time of a transmission process in the facsimile transmission mode, the image-quality adjustment section 11 through the halftone generation section 18 all operate except for the two-color printing process section 12, the color correction section 13, and the black generation and under color removal section 14 (see FIG. 7). Meanwhile, at the time of a preview display in the facsimile transmission mode, the image-quality adjustment section 11 through the halftone generation section 18 all operate except for the two-color printing process section 12, the color correction section 13, the black generation and under color removal section 14, and the halftone generation section 18 (see FIG. 8).

(2-4) Steps of a Process

Next, an example of steps of a process in the facsimile transmission mode is described. In cases where the image forming apparatus 100 receives a fax transmission command from the user with the image forming apparatus 100 having not been set to "Preview Display: Yes", the image forming apparatus 100 processes image data as shown in FIG. 7 and transmits the image data to an external apparatus.

Meanwhile, in cases where the image forming apparatus 100 receives a fax transmission command from the user with the image forming apparatus 100 set to "Preview Display: Yes", the image forming apparatus 100 processes image data as shown in FIG. 8, thereby storing the image data in the storage device 107 and displaying a preview of an image of the image data on the image display device 104. Then, when the image forming apparatus 100 receives a transmission permission command from the user with the preview being displayed, the image forming apparatus 100 reads out the image data from the storage device 107, processes the image data in the decompression section 9 through the halftone generation section 18 as shown in FIG. 7, and transmits the image data to an external apparatus via the transmitting device 106.

(3) Facsimile Reception Mode (3-1) Printing Process (Image Print Job)

Figure 9:
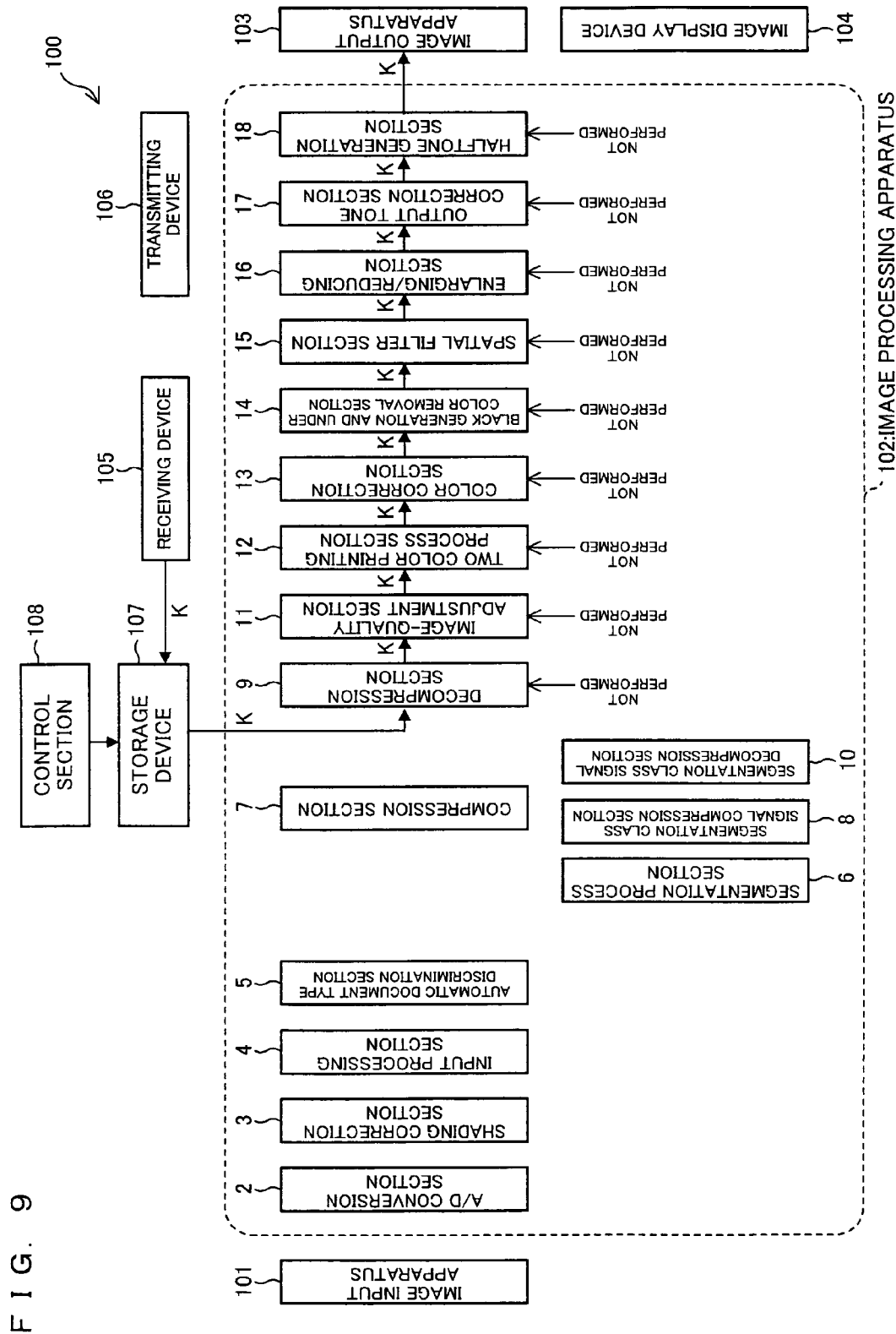
FIG. 9

FIG. 9 is a block diagram showing the same image forming apparatus 100 as in FIG. 1 and showing the flow of image data in a printing process in the facsimile reception mode.

In the case of facsimile reception, the receiving device 105 receives K image data (1 bit) from the source while performing a communication procedure. Then, the K image data received by the receiving device 105 are decompressed by the compression/decompression section (not shown), rotated by the rotation process section (not shown) as needed, and then subjected to a resolution conversion process by a resolution conversion section (not shown). After that, the image data are stored temporarily in the storage device 107.

Furthermore, the image data written in the storage device 107 are passed on to the decompression section 9 of the image processing apparatus 102 by the control section 108. The decompression section 9, the image-quality adjustment section 11, the two-color printing process section 12, the color correction section 13, the black generation and under color removal section 14, the spatial filter section 15, the enlarging/reducing section 16, the output tone correction section 17, and the halftone generation section 18 perform no processing on the image data sent from the storage device 107 and pass the image data directly onto the subsequent image output apparatus 103. The image output apparatus 103 forms an image on a recording medium (e.g., a sheet of paper) in accordance with the K image data sent from the halftone generation section 18. In the case of a printing process in the facsimile reception mode, image processing is not performed as described above. Therefore, the image data stored in the storage device 107 may be outputted directly to the image output apparatus 103.

(3-2) Preview Display

Figure 10:
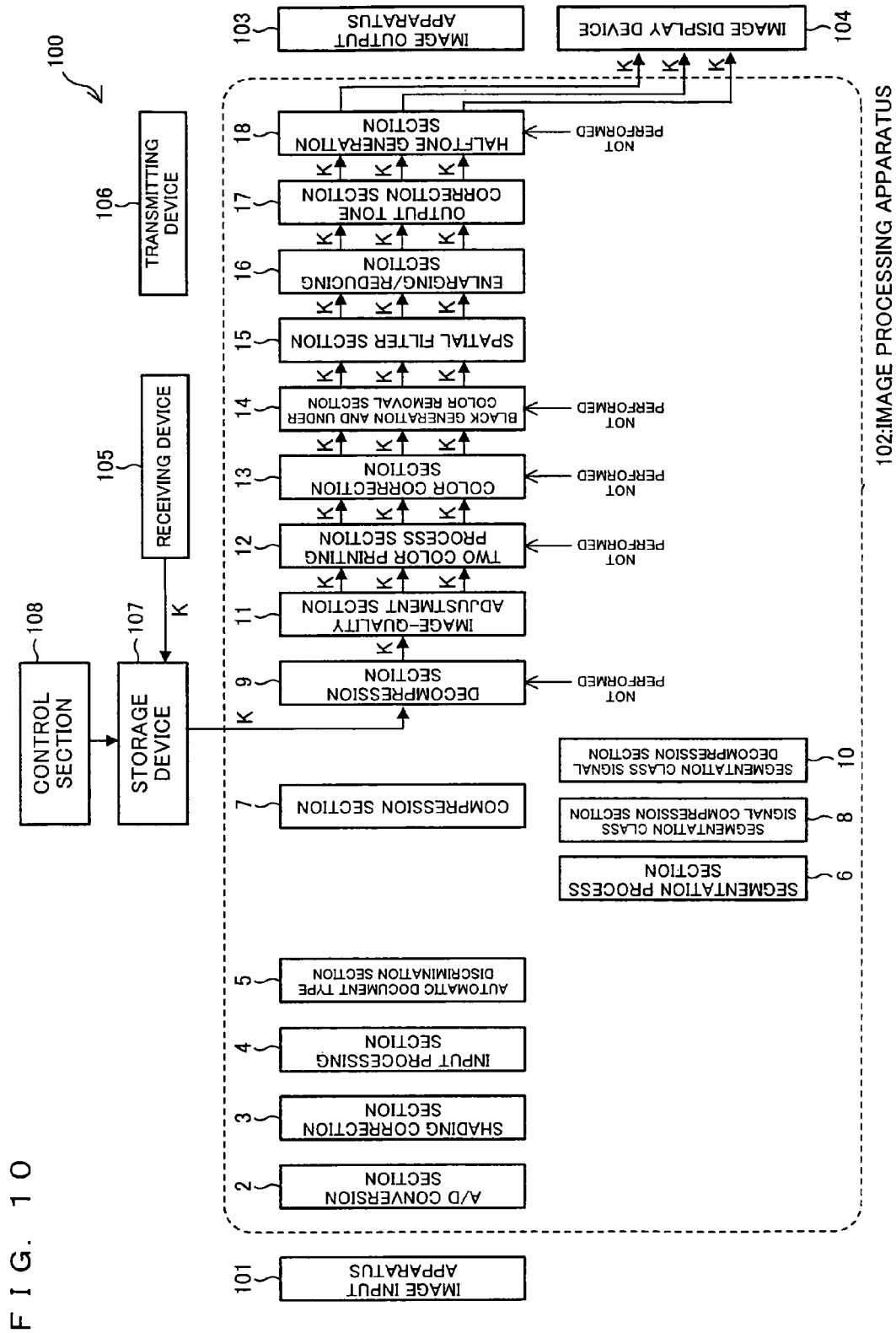
FIG. 10

FIG. 10 is a block diagram showing the same image forming apparatus 100 as in FIG. 1 and showing the flow of image data in a preview display process in the facsimile reception mode. The term "preview display in the facsimile reception mode" here means a process of, before printing an image of image data received by facsimile, displaying a preview of the image to be printed.

Also at the time of a preview display in the facsimile reception mode, as in the case of a printing process in the facsimile reception mode, the image data written in the storage device 107 are passed on to the decompression section 9 of the image processing apparatus 102 by the control section 108. The decompression section 9 performs no processing on the image data sent from the storage device 107 and passes the image data on to a bit-number conversion process section (not shown). Then, the bit-number conversion process section converts the number of bits of the image data sent from the decompression section 9 (e.g., from 1 bit to 8 bits), and then passes the image data on to the image-quality adjustment section 11. That is, although not shown in FIG. 10, the decompression section 9 and the image-quality adjustment section 11 has the bit-number conversion section provided therebetween.

As shown in FIG. 10, for each pixel, the image-quality adjustment section 11 receives one piece of K image data and generates and outputs three pieces of K image data (all being equal in value). This is because the image display device 104 is a full-color model and as such requires three values for one pixel.

After that, the two-color printing process section 12, the color correction section 13, and the black generation and under color removal section 14 perform no processing on the K image data sent from the image-quality adjustment section 11 and pass the image data directly on the subsequent spatial filter section 15. The spatial filter section 15 performs a blur (smoothing) process and the like on the K image data with use of a digital filter.

The enlarging/reducing section 16 performs a downsampling process on the K image data so that the number of pixels of an image of the K image data sent from the spatial filter section 15 conforms to the number of pixels of the display size of the image display device 104. Further, the enlarging/reducing section 16 enlarges or reduces the image in accordance with an enlarging/reducing command (information indication the zoom ratio of a display, e.g., a fixed zoom ratio of 2 to 4 times) inputted from the operation panel (not shown) provided in the image forming apparatus 100.

The output tone correction section 17 receives the K image data from the enlarging/reducing section 16 and performs output gamma correction on the K image data in conformity to the display characteristics of the image display device 104. Then, the halftone generation section 18 performs no processing on the K image data sent from the output tone correction section 17 and passes the K image data directly on to the subsequence image display device 104. This allows the image display device 104 to display, in accordance with the K image data, a preview of an image received by facsimile.

(3-3) As to Whether The Blocks Operate or Do Not Operate

As described above, at the time of a printing process in the facsimile reception mode, the image-quality adjustment section 11 through the halftone generation section 18 do not operate (see FIG. 9). Meanwhile, at the time of a preview display in the facsimile reception mode, the image-quality adjustment section 11 through the halftone generation section 18 all operate except the two-color printing process section 12, the color correction section 13, the black generation and under color removal section 14, and the halftone generation section 18 (see FIG. 10).

(3-4) Steps of a Process

Next, an example of steps of a process in the facsimile reception mode is described. In cases where the image forming apparatus 100 receives image data by facsimile, the received image data are written temporarily in the storage device 107. It should be noted here that there is a time lag between the writing of the image data in the storage device 107 and printing of an image. In cases where the user inputs a "preview command" during the time lag, the image data is processed along such a flow as shown in FIG. 10, and a preview of an image of the image data is displayed by the image display device 104. Further, when the image is printed, the image data is processed along such a flow as shown in FIG. 9, and the image of the image data is printed by the image output apparatus 103.

(4) Image Transmission Mode (4-1) Transmission Process (Image Transmission Job)

In the case of operation of the image forming apparatus 100 at the time of a transmission process in the image transmission mode, the image input apparatus 101, the A/D (analog/digital) conversion section 2, the shading correction section 3, the input processing section 4, the automatic document type discrimination section 5, the segmentation process section 6, the compression section 7, the segmentation class signal compression section 8, and the decompression section 9 performs the same processes as in the case of the copier mode. It should be noted that the segmentation class signal decompression section 10 supplies the segmentation class signals to the spatial filter section 15 and the output tone correction section 17.

Then, the image-quality adjustment section 11 performs a background removal process and color balance adjustment. The color correction section 13 converts the image data into R"G"B" image data (e.g., sRGB data) conforming to the display characteristics of a commonly-used display device. The spatial filter section 15 performs a spatial filter process (edge enhancement process, smoothing process) by a digital filter in accordance with the segmentation class signals. The enlarging/reducing section 16 enlarges or reduces the image. Further, the output tone correction section 17 performs correction on a text area with use of the gamma curve of (b) of FIG. 5, and performs correction on a nontext area with use the gamma curve of (a) of FIG. 5, for example. The two-color printing process section 12 and the black generation and under color removal section 14 perform no processing on the input image data, and each of the blocks passes the image data directly on to the subsequent block. Therefore, the output tone correction section 17 outputs the R"G"B" image data.

Furthermore, the R"G"B" image data from the output tone correction section 17 are converted into an image file such as a PDF file by a format conversion process section (not shown). Then, in the scan to e-mail mode, which is an image transmission mode, the image file is attached to an e-mail by the mail processing section (job apparatus; not shown), and the e-mail is transmitted to the destination via a network. Alternatively, in the scan to ftp mode, which is another image transmission mode, the image file is transmitted to a predetermined folder. Alternatively, in the scan to usb mode, which is the other image transmission mode, the image file is transmitted to a predetermined USB memory.

(4-2) Preview Display

In the case of operation of the image forming apparatus 100 at the time of a preview display in the image transmission mode, the image input apparatus 101, the A/D (analog/digital) conversion section 2, the shading correction section 3, the input processing section 4, the automatic document type discrimination section 5, the segmentation process section 6, the compression section 7, the segmentation class signal compression section 8, the decompression section 9, the segmentation class signal decompression section 10, the image-quality adjustment section 11, and the two-color printing process section 12 perform the same processes as in the case of transmission in the image transmission mode.

Then, at the time of a preview display in the image transmission mode, the color correction section 13 converts the RGB image data into R'G'B' image data conforming to the color space of the image display device 104.

After that, as in the case of transmission, the spatial filter section 15 performs a spatial filter process (edge enhancement process, smoothing process) by a digital filter in accordance with the segmentation class signals. The enlarging/reducing section 16 performs a downsampling process for a match in size for the image display device 104. Further, the output tone correction section 17 performs correction on a text area with use of the gamma curve of (*b*) of FIG. 5, and performs correction on a nontext area with use the gamma curve of (*a*) of FIG. 5, for example.

Then, the output tone correction section 17 supplies the R'G'B' image data to the image display device 104, and the image display device 104 performs a preview display in accordance with the R'G'B' image data.

(5) Modification

Figure 11:
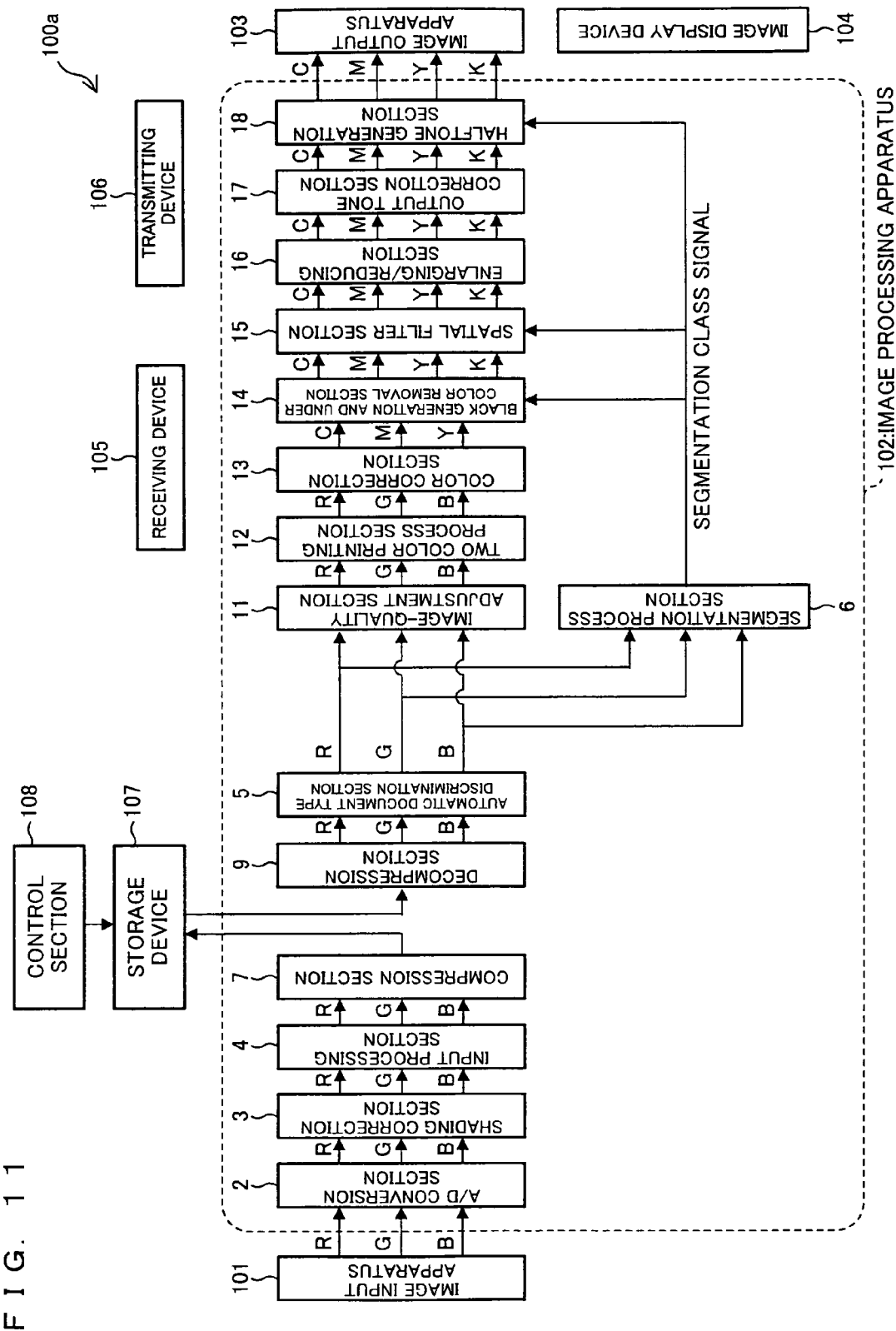
FIG. 11

In the image forming apparatus 100 of FIG. 1, the compressed image data (encoded codes) and the segmentation class signal codes are stored in the storage device 107 in association with one another. However, as in an image forming apparatus 100*a* of FIG. 11, there may be such an arrangement that: after the image input apparatus 101 reads image data, the image data are encoded and stored temporarily in the storage device 107 before a segmentation process and an automatic document type discrimination process; and the image data are read out from the storage device 107, decompressed, and then subjected to a segmentation process and an automatic document type discrimination process.

Further, the image forming apparatus 100 of FIG. 1 may be capable of executing an image filing mode (image filing job) during a job such as the copier mode, the printer mode, the facsimile transmission mode, the facsimile reception mode, or the image transmission mode. The image filing mode is a mode in which to create an image file (e.g., JPEG or TIFF file), during a job such as the copier mode, in accordance with image data obtained by the image input apparatus 101 or image data received from outside and store the image file in the storage device 107.

At the time of filing in the image filing mode, the image data obtained by the image input apparatus 101 or the image data received from outside are converted into an image file (e.g., JPEG or TIFF file) by the image processing apparatus 102. The image filed is sent to a filing processing section (job apparatus; not shown). The filing processing section stores the image file in the storage device 107.

Further, in the case of a preview during each job (e.g., the copier mode, the print mode, or the facsimile transmission mode), the image data obtained by the image input apparatus 101 or the image data received from outside are processed by the image processing apparatus 102, and then sent to the image display device 104, regardless of the execution of the image filing mode. Furthermore, in the case of a preview during each job, the image processing apparatus 102 executes the same image processing regardless of the execution of the image filing mode. For example, at the time of a preview display in the copier mode, the image processing apparatus 102 performs such processes as shown in FIG. 3, regardless of the execution of the image filing mode. Further, at the time of a preview display in the facsimile transmission mode, the image processing apparatus 102 performs such processes as shown in FIG. 8, regardless of the execution of the image filing mode.

(6) Advantages of The Image Processing Apparatus of The Present Embodiment

The image processing apparatus 102 of the present embodiment supplies image data to the image output apparatus (job apparatus, printing apparatus) 103, which performs a print job (copier mode, print mode), and supplies the image data to the image display device 104 so that the image display device 104 displays a preview before the execution of the print job.

Moreover, the image processing apparatus 102 includes a first image processing section which performs first image processing on image data to be supplied to the image output apparatus 103, which performs second image processing on image data to be supplied to the image display device 104, the second image processing being different from the first image processing, and which performs the first image processing and the second image processing with use of a common circuit area. An example of the first image processing section is the color correction section 13 in the copier mode and the full-color mode. This is because the color correction section 13 uses a common circuit area for a process of conversion from RGB into CMY (first image processing) and a process of conversion from RGB into R'G'B' (second image processing).

This brings about a merit of reducing the circuit size of an image processing circuit even in an image processing apparatus that performs image processing for a printing process or the like and image processing for a preview before the printing process.

Further, in the present embodiment, at the time of printing in the copier mode and the full-color mode, the color correction section 13 performs a process by which additive image data (RGB) read by the scanner and conforming to the characteristics of the scanner are converted into subtractive image data (CMY) conforming to the characteristics of the image output apparatus 103. Meanwhile, at the time of a preview in the copier mode and the full-color mode, the color correction section 13 performs a process by which the additive image data (RGB) read by the scanner and conforming to the characteristics of the scanner are converted into additive image data (R'G'B') conforming to the characteristics of the image display device 104. That is, at the time of a preview display, the additive image data conforming to the characteristics of the scanner are converted directly into the image data conforming to the characteristics of the image display device 104. Therefore, at the time of a preview display in the copier mode and the full-color mode, the image processing apparatus 102 of the present embodiment performs a single nonlinear conversion from the RGB image data into the R'G'B' image data, but does not perform a plurality of nonlinear conversions as in the arrangement of Japanese Patent Application Publication, Tokukaihei, 9-135316 A (1997), thus making it possible to suppress accumulation of errors in conversion and suppress deterioration in color reproducibility. In Japanese Patent Application Publication, Tokukaihei, 9-135316 A (1997), a total of four conversions are performed, namely the conversion from RGB data into CMY data, the conversion from CMY data into CMYK data, the conversion from CMYK data into CMY data, and the conversion from the CMY data into RGB data, which result in accumulation of errors in conversion and deterioration in color reproducibility.

Further, at the time of a preview in the copier mode and the single-color mode or at the time of a preview in the copier mode and the two-color mode, the present embodiment performs such a nonlinear conversion, but the number of such nonlinear conversions is only two. Therefore, it is possible to better suppress deterioration in color reproducibility than in the arrangement of Japanese Patent Application Publication, Tokukaihei, 9-135316 A (1997), in which a total of four nonlinear conversions are performed.

Furthermore, in the present embodiment, at the time of printing in the copier mode and the full-color mode, the black generation and under color removal section 14 converts CMY image into CMYK image data; meanwhile, at the time of a preview display in the copier mode and the full-color mode, the black generation and under color removal section 14 performs no processing on R'G'B' and outputs R'G'B' directly. This makes it possible to simplify the circuit arrangement by using a common image data path in the image processing circuit for printing image data that needs to be converted from CMY into CMYK and preview image data that does not need to be subjected to a black generation and under color removal process.

The image processing apparatus 102 of the present embodiment can perform image processing based on a result of judgment by the automatic document type discrimination section 5, image processing based on a result of processing by the segmentation process section 6, and a background removal process. The effects of these processes are reflected in a preview image that is displayed by the image display device 104.

Embodiment 2

In the present embodiment, a preview of an output image to be subjected to an output process by an image forming apparatus is displayed before the output process is carried out. Further, out of image processes to be carried out on the output image, the content of an image process which a user cannot recognize from the preview of the output image is notified to the user.

Here, the "output process" means a facsimile transmission process for transmitting the output image via facsimile, a first transmission process for transmitting the output image in such a manner that the output image is attached to an e-mail, a second transmission process for transmitting the output image to a folder designated by a user, a third transmission process for transmitting the output image to a USB memory attached to an image forming apparatus, and a filing process for converting the output image into an image file with a predetermined file format and storing the image file, as well as a printing process for printing the output image.

The printing process means all of a printing process in a copier mode, a printing process in a print mode, and a printing process in a facsimile reception mode. Further, the facsimile transmission process means a transmission process in a facsimile transmission mode. The first transmission process means a transmission process in a scan to e-mail mode in an image transmission mode. The second transmission process means a transmission process in a scan to ftp mode in the image transmission mode. The third transmission process means a transmission process in a scan to usb mode in the image transmission mode. The filing process means a filing process in an image filing mode.

The following explains the present embodiment. In the present embodiment, members having the same functions as those used in Embodiment 1 are given the same reference numerals and explanations thereof are omitted here.

Figure 12:
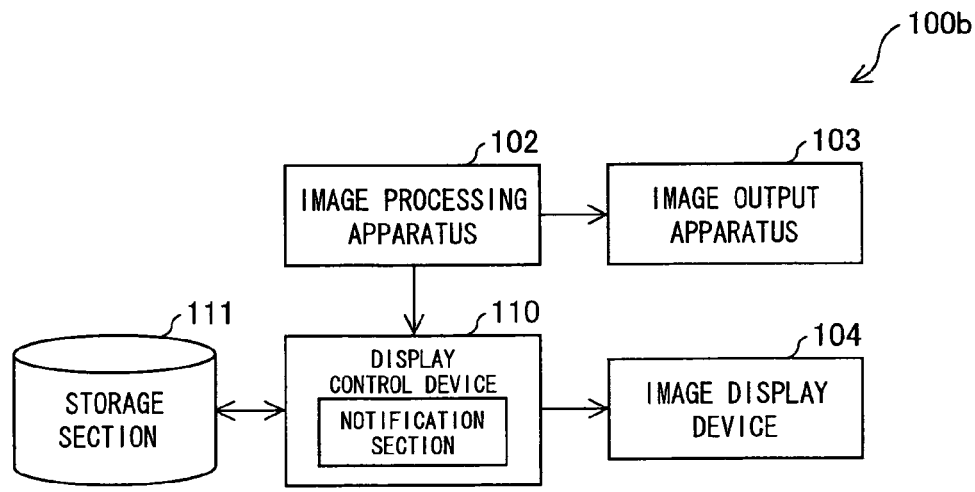
FIG. 12

FIG. 12 is a block diagram schematically showing a configuration of an image forming apparatus 100b in accordance with Embodiment 2. As shown in FIG. 12, the image forming apparatus 100b includes a display control device (notification section, image display control section) 110 and a storage section 111 as well as an image processing apparatus 102, an image output apparatus 103, and an image display control device (display device) 104. Although not shown in FIG. 12, the image forming apparatus 100b includes a receiving device 105, a transmitting device 106, a storage device 107, a control section 108, a mail processing section etc., as in the image forming apparatus 100 of Embodiment 1.

The display control device 110 is a control circuit for controlling display operation of the image display device 104. The display control device 110 controls the image display device 104 so that the image display device 104 displays a GUI or an operation guide by which a user enters commands into the image forming apparatus 100.

The storage section 111 is a storage region in which specific information for specifying an image process which a user cannot recognize from a previewed output image out of image processes executable by the image processing apparatus 102 is stored (registered). The storage section 111 may be a hard disk or ROM (Read Only Memory).

Here, the specific information is a table that lists first identification information for showing the name or the type of the image process which a user cannot recognize from a previewed output image. For example, in a case where the image process which a user cannot recognize from a previewed output image is a color balance adjustment and a sharpness adjustment, the specific information is a table that lists the name of "color balance adjustment" and the name of "sharpness adjustment".

In the image forming apparatus 100b, when a user enters a preview confirmation command, image data for preview display (R'G'B' image data) is sent from the image processing apparatus 102 to the display control device 110. The display control device 110 causes the image display device 104 to display a preview output image based on the image data.

The following specifically explains this regard. For example, in a case where a document has been scanned and an image of the document is not yet printed in a copier mode, the display control device 110 causes the image display device 104 to display an initial image shown in FIG. 14. When a user presses a preview confirmation button indicated by a reference numeral 70 in FIG. 14 to enter a preview confirmation command, the display control device 110 causes the image display device 104 to display a preview confirmation image (see FIG. 15) that is a previewed output image. In a case of the preview confirmation image shown in FIG. 15, an output image is shown as a preview image in a region indicated by a reference numeral 71.

Further, in the present embodiment, while displaying a preview image, when a user enters a setting confirmation command, the display control device 110 causes the image display device 104 to display a setting confirmation image for showing the content of an image process which the user cannot recognize from a previewed output image out of image processes to which an image to be outputted is subjected.

The following explains this regard specifically. While displaying a preview confirmation image shown in FIG. 15, when a user presses a setting confirmation button indicated by a reference numeral 72 in FIG. 15 to enter a setting confirmation command, the display control device 110 causes the image display device 104 to display a setting confirmation image shown in FIG. 18. In the setting confirmation image in FIG. 18, "document type mode", "color balance adjustment", and "sharpness adjustment" are shown as the content of an image process which the user cannot recognize from a preview output image.

To be more specific, the display control device 110 acquires, from the image processing apparatus 102, second identification information for showing the name or the type of an image process to which an output image is to be subjected to when executing an output process (e.g. printing) (image process set with respect to each user or initially set image process). Then, the display control device 110 compares second identification information acquired from the image processing apparatus 102 with specific information (table that lists first identification information) stored in the storage section 111 in order to select an image process which a user cannot recognize from a previewed image out of image processes to which an output image is to be subjected to when executing an output process (e.g. printing). Then, the display control device 110 causes the image display device 104 to display a setting confirmation image (see FIG. 18) showing the content of the selected image process.

Figure 18:
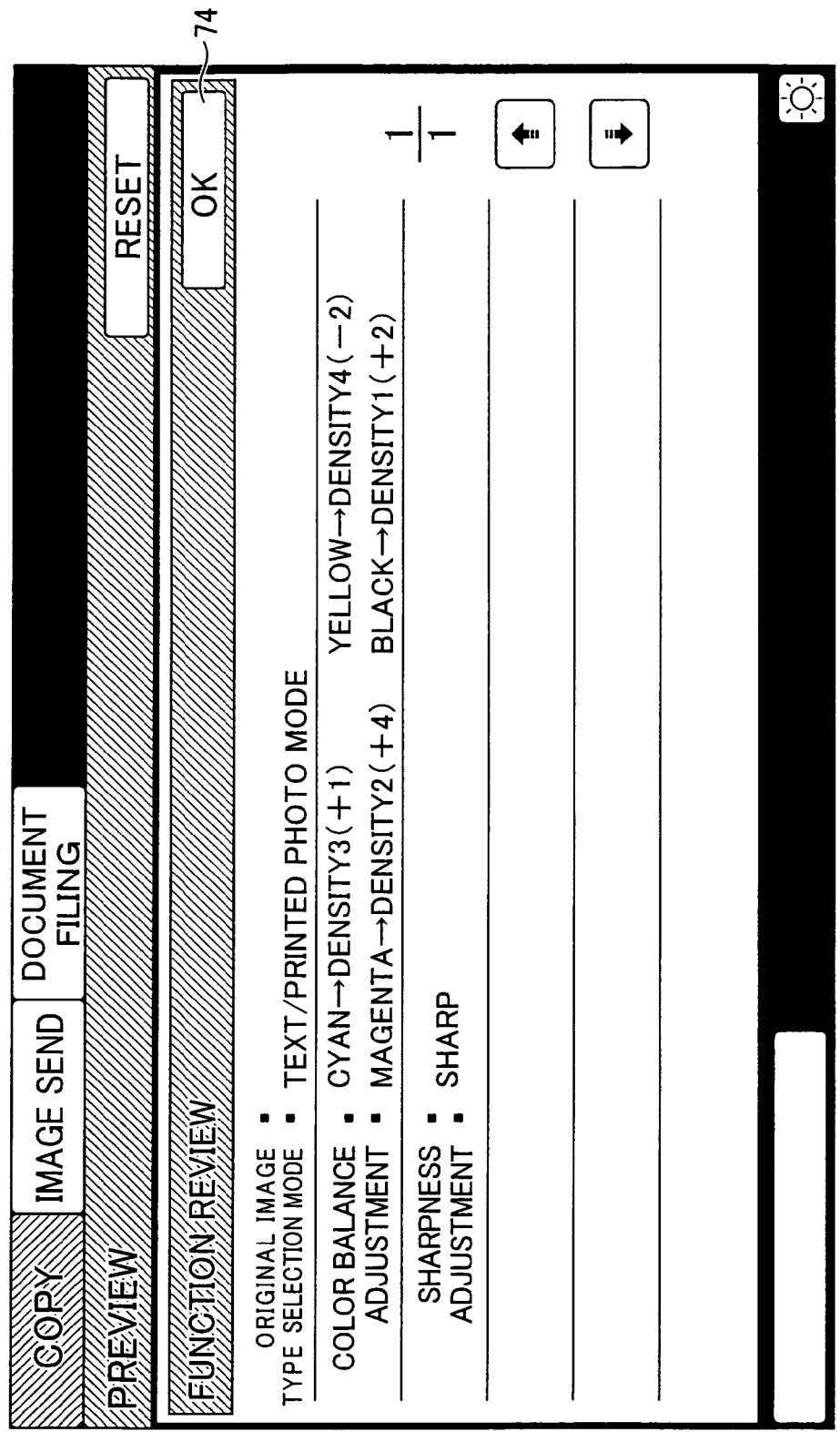
FIG. 18

Causing the image display device 104 to display the setting confirmation image shown in FIG. 18 allows a user to confirm the content of an image process which the user cannot recognize from a previewed output image out of image processes to which the output image is to be subjected. Therefore, when displaying a preview output image to the user before the output image is outputted, it is possible for the user to know the content of the image process to which the output image is to be subjected and image quality of the output image without any misunderstanding.

Figure 17:
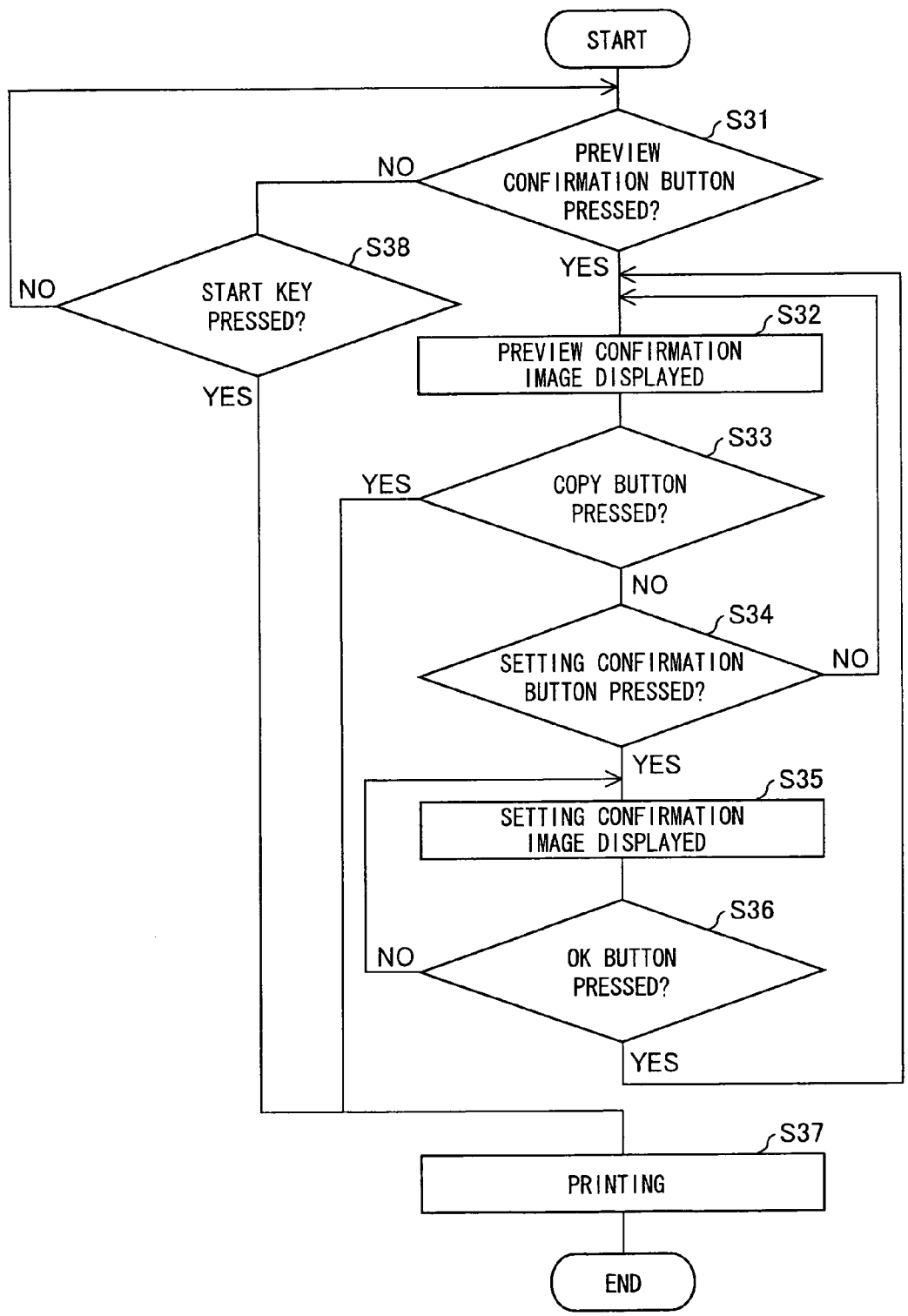
FIG. 17

The following explains the flow of a process carried out by the display control device 110 with reference to the flowchart of FIG. 17. It should be noted that at the start of the flowchart of FIG. 17, the image forming apparatus 100b is in a state where a document has been scanned and an image of the document is not yet printed in the copier mode. At that time, the image display device 104 displays an initial image shown in FIG. 14.

Figure 14:
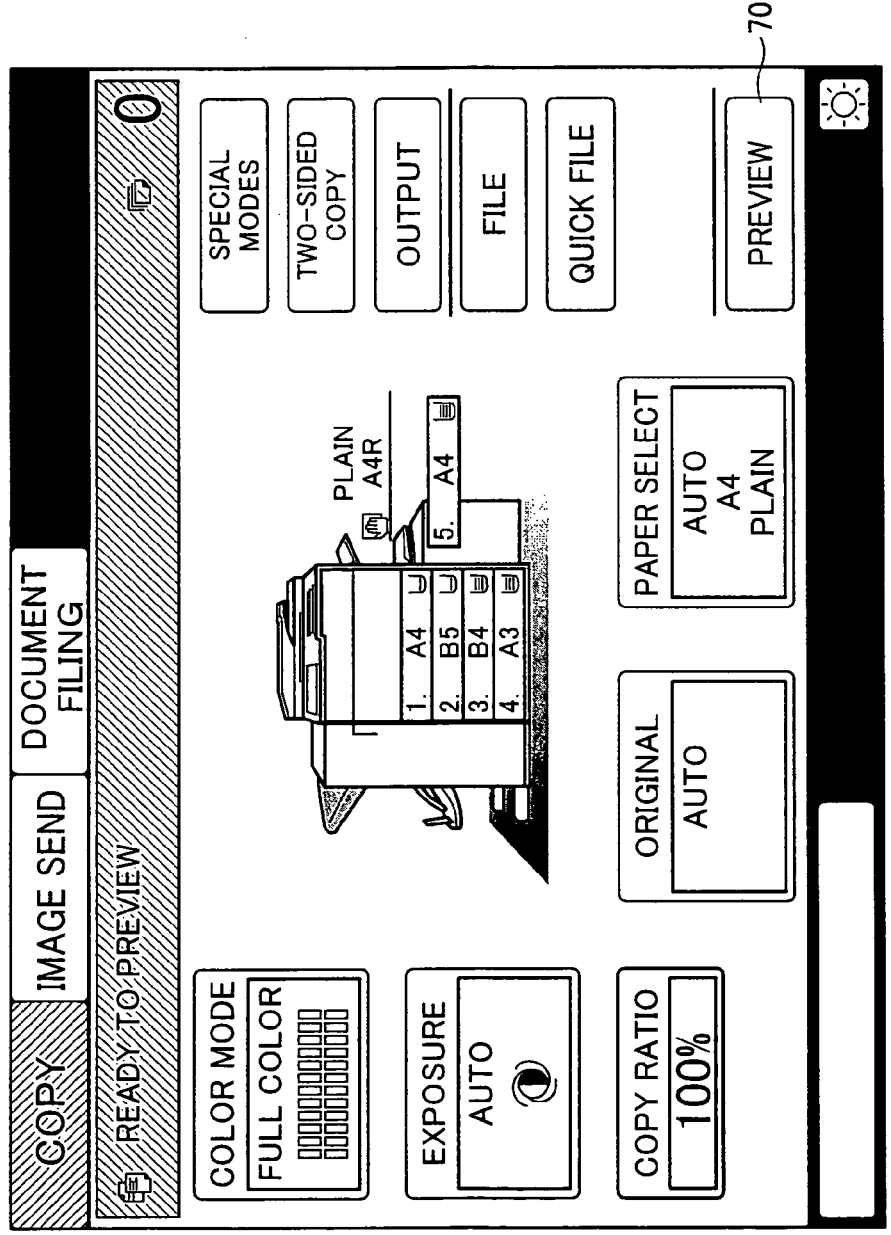
FIG. 14
Figure 15:
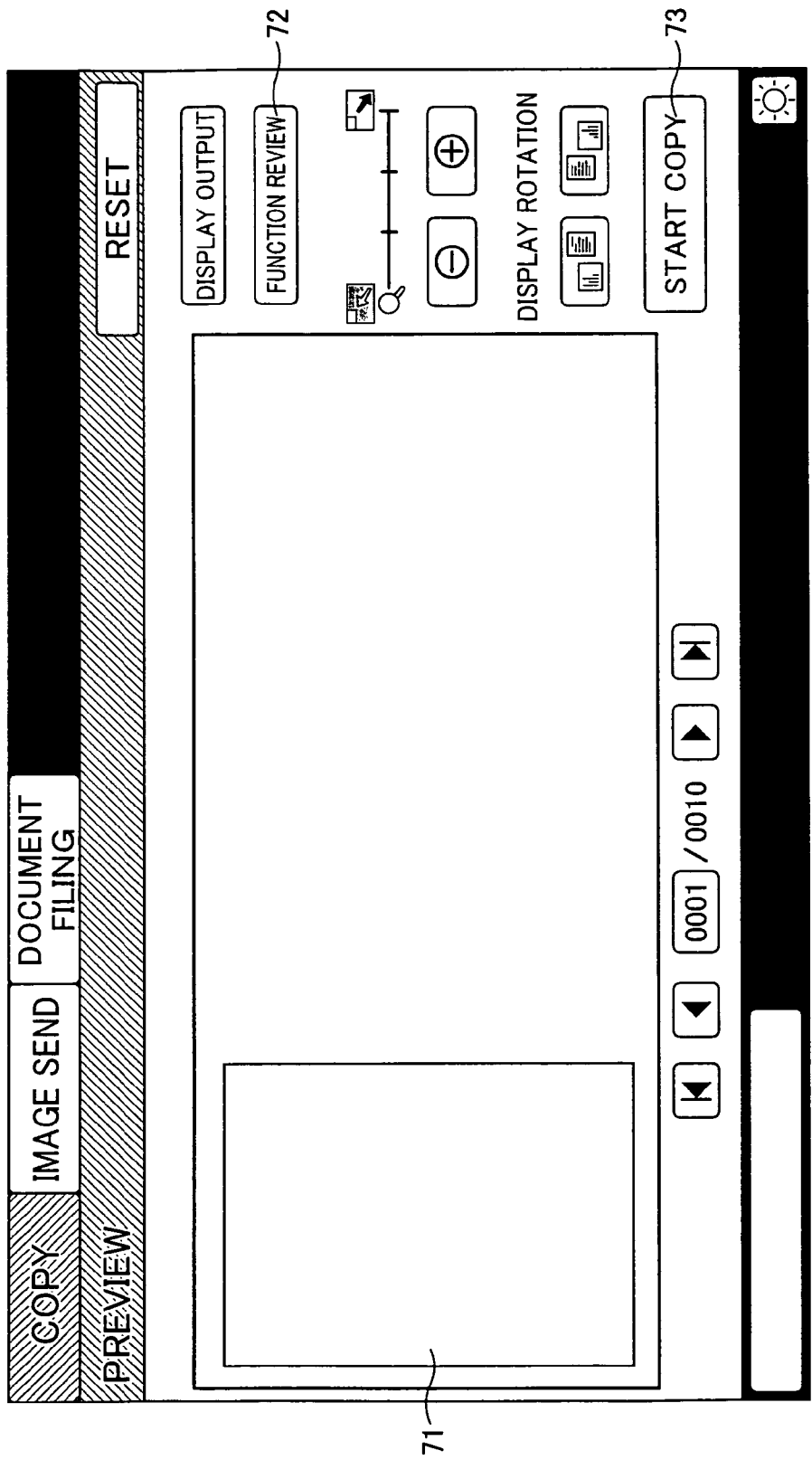
FIG. 15

When the preview confirmation button 70 in the initial image shown in FIG. 14 is pressed (YES in S31), the display control device 110 causes the image display device 104 to display a preview confirmation image shown in FIG. 15 (S32). On the other hand, in the state where the initial image in FIG. 14 is displayed, when a start key (not shown) provided in an operation panel is pressed (NO in S31 and YES in S38), the image output apparatus 103 carries out printing (S37), and thus the process in the copier mode is completed.

In a state where the image display device 104 displays the preview confirmation image in FIG. 15, when the setting confirmation button 72 in FIG. 15 is pressed (NO in S33 and YES in S34), the display control device 110 causes the image display device 104 to display a setting confirmation image in FIG. 18 (S35).

Then, in a state where the image display device 104 displays the setting confirmation image in FIG. 18, when an OK button 74 in FIG. 18 is pressed ((YES in S36), the display control device 110 causes the image display device 104 to finish displaying the setting confirmation image in FIG. 18 and to display the preview confirmation image in FIG. 15 again. Then, in the state where the image display device 104 displays the preview confirmation image in FIG. 15, when a copy button 73 in FIG. 15 is pressed (YES in S33), the image output apparatus 103 carries out printing (S37), and the process in the copier mode is completed. If a user considers the display of the setting confirmation image in FIG. 18 as unnecessary, the user may press the copy button 73 in FIG. 15 after the preview confirmation image in FIG. 15 is displayed, instead of pressing the setting confirmation button 72 in FIG. 15 (YES in S33).

Although omitted in FIG. 17, pressing a start key (not shown) in the operation panel while displaying the preview confirmation image in FIG. 15 or the setting confirmation image in FIG. 18 results in printing, and thus the process in the copier mode is completed.

As described above, the display control device 110 of the present embodiment serves as an image display control section for causing the image display device 104 to display a setting confirmation image (process content image) showing the content of an image process which a user cannot recognize from the previewed output image out of image processes to which the output image is to be subjected. In other words, the display control device 110 serves as a notification section for notifying a user of the content of an image process which a user cannot recognize from the previewed output image out of image processes to which the output image is to be subjected. This allows the user to correctly know the content of image processes to which the output image is to be subjected or image quality of the output image after the output process.

Further, as shown in FIG. 15, the display control device 110 of the present embodiment causes the image display device 104 to simultaneously display a preview of the output image and the setting confirmation button (input button) 72 by which a display command of the setting confirmation image is inputted. When the display control device 110 detects input of the display command in response to pressing of the setting confirmation button 72, the display control device 110 causes the image display device 104 to display the setting confirmation image in FIG. 18. Therefore, it is possible to switch between display and non-display of the setting confirmation image in response to a user's request. This provides a device usable also by a user who considers the display of the setting confirmation image as unnecessary.

With reference to specific examples (a)-(f), the following details the content of an image process which a user cannot recognize from a previewed output image out of image processes to which an output image is to be subjected. The content includes a first process content which cannot be reflected on image data for preview display, and a second process content which can be reflected on image data for preview display but whose effect is difficult to identify. That is, the first process content which cannot be reflected on image data for preview display is a process content to which image data for an output process (printing, transmission etc.) can be subjected but image data for preview display cannot be subjected. On the other hand, the second process content which can be reflected on image data for preview display but whose effect is difficult to identify is a process content to which both of image data for an output process and image data for preview display are subjected but whose effect is difficult to identify from the image data for preview display.

(a) Adjustment of Color Balance

Figure 13:
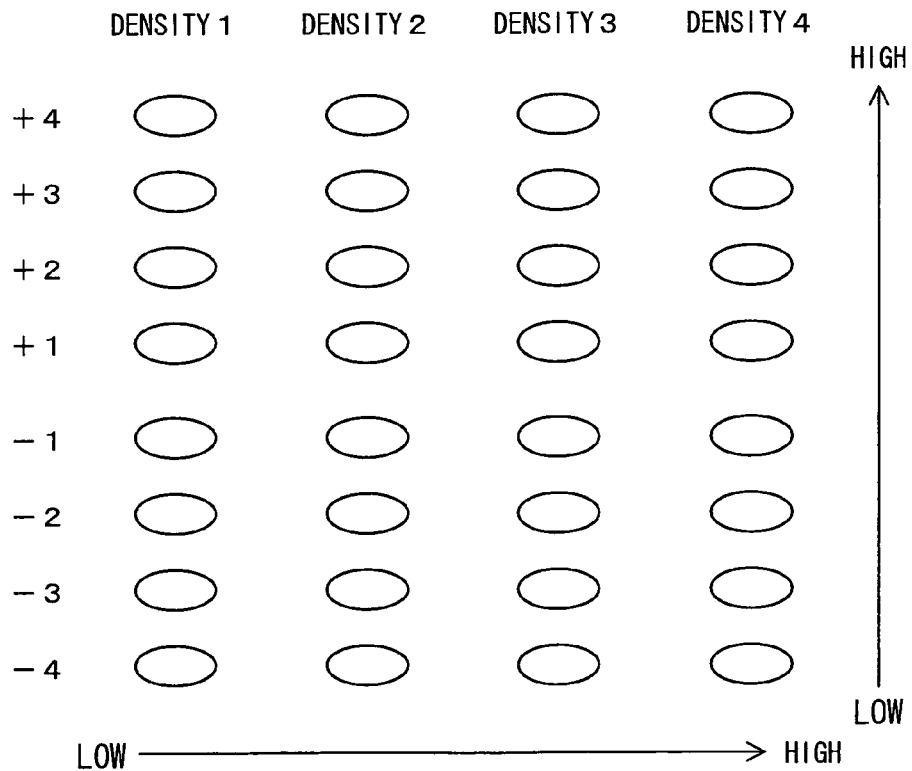
FIG. 13

Adjustment of color balance means a process for adjusting density of an output image with respect to each color component. Specifically, adjustment of color balance means a process for adjusting density of a color selected by a user out of C, M, Y, and K. For example, as shown in FIG. 13, a density range is separated into four ranges (densities 1-4), each of which is adjustable in eight stages. That is, a user selects a color whose density is to be adjusted and a density range, and selects one stage out of eight stages of the selected density range. The adjustment of color balance is carried out by the image quality adjustment section 11 or the output tone correction section 17.

In the above adjustment of color balance, CMYK densities are adjusted, whereas preview display is carried out based on R'G'B' image data. Therefore, the adjustment of color balance cannot be reflected on image data for preview display.

Accordingly, the adjustment of color balance belongs to the first process content that cannot be reflected on image data for preview display.

(b) Format Process

A format process is a process for converting an output image into an image file with a predetermined file format. Specifically, the format process is a process for converting RGB image data inputted to the image processing apparatus 102 into an image file with a file format selected by a user. The format process is carried out by a format conversion process section (not shown) that operates in the image transmission mode or a compression section 7. Examples of convertible file formats include JPEG, PDF, TIFF, compact PDF, encrypted PDF, and XPS.

A difference in a format is not reflected on a displayed image. That is, the format process belongs to the first process content that cannot be reflected on image data for preview display. Without displaying identification information for indicating the format name etc., it is difficult for a user to identify the format of an image only by relying on a preview of the image.

The compact PDF is a technique for classifying image data into a foreground layer (text and line art image region) and a background layer (region other than text and line art image region) on the basis of a segmentation class signal and compressing the foreground layer and the background layer with use of respectively suitable compression techniques.

(c) Document Type-based Process Mode

A document type-based process mode is a mode for selecting an image process to be carried out on an output image in accordance with the type of a document. Examples of the document type include a printed picture (printed photograph), a text printed picture, and a photograph (a continuous tone photograph).

In a case where the document type-based process mode is selected by a user, a process is carried out according to the document type selected by the user or the document type discriminated by the document type automatic discrimination section 5. In a case where the output image is processed in the document type-based process mode, if the screen size of the image display device 104 is large, then there is no problem. However, if the screen size of the image display device 104 is small, then a difference in generation rate of moiré arises between an outputted image (subjected to printing etc.) and a displayed image because image data is greatly downsampled. Accordingly, the document type-based process mode belongs to the second process content which can be reflected on image data for preview display but whose effect is difficult to identify.

In a case where a document is a printed picture (halftone dot image), for example, a color correction process and a black generation and under color removal process suitable for tone reproduction for a halftone dot region are carried out, and a smoothing process for preventing moiré is carried out. In a case where a document is a photograph (continuous tone photograph), for example, a color correction process and a black generation and under color removal process suitable for tone reproduction for a continuous tone region are carried out. In a case where a document is a text printed picture document (in which a halftone dot image and a text are mixed), the document is separated into a text portion and a halftone dot image portion by a segmentation process, and the text portion is subjected to an enhancement filter process that emphasizes resolution and the halftone dot image portion is subjected to the color correction process and the black generation and under color removal process suitable for tone reproduction as in the printed picture document.

In the case where the document type-based process mode is selected by a user, the name of a document type currently in set may be displayed by the image display device 104 as shown in FIG. 18 so that the user can confirm the name of the document type.

(d) Sharpness Adjustment Process

A sharpness adjustment process is a sharpening process (edge enhancement process) on the output image or a blur process (enhancement and smoothing process) on the output image. In the present embodiment, the sharpness adjustment process is carried out by the spatial filter section 15. Specifically, the spatial filter section 15 selects, according to setting selected by a user, a process to be selected based on a segmentation class signal. For example, when the user selects "soft", the enhancement and smoothing process is carried out. When the user selects "sharpness", the sharpening process (sharp filter) is carried out.

Image data for preview display is greatly downsampled. Accordingly, when the image data is subjected to the sharpening process by the spatial filter section 15, thin lines of the image are broken, sharpness of the image is reduced rather than enhanced, resulting in an effect opposite to a printed image. Therefore, the sharpness adjustment process is the second process content which can be reflected on image data for preview display but whose effect is difficult to identify.

(e) Resolution Conversion

Resolution conversion is a process for converting resolution of the output image. Specifically, the resolution conversion is a process for converting resolution of image data from input resolution (resolution of scanner) to transmission resolution when carrying out a transmission process in a facsimile transmission mode or an image transmission mode. The transmission resolution is set by a user. Without setting by the user, the transmission resolution is automatically set to a default value.

Since resolution of image data for preview display is converted according to the size of a display screen of the image display device 104 (e.g. 600 dpi→75 dpi), the resolution of the image data is converted into resolution different from transmission resolution. Therefore, the resolution conversion belongs to the second process content which can be reflected on image data for preview display but whose effect is difficult to identify.

(f) Compression Process

A compression process is a process for compressing the output image. In the present embodiment, when a user selects a JPEG format in the format process in the item (b), an image is compressed with a compression ratio selected by the user. The user selects a desired compression rate out of a high compression rate, a middle compression rate, and a low compression rate.

When image data is compressed, a noise is more likely to appear in an image as the compression rate is higher. However, since image data for preview display is downsampled, the noise cannot be seen in a previewed image. Consequently, it is difficult to discern a noise on a previewed image at the time of high compression in particular. Therefore, the resolution conversion belongs to the second process content which can be reflected on image data for preview display but whose effect is difficult to identify.

Figure 16:
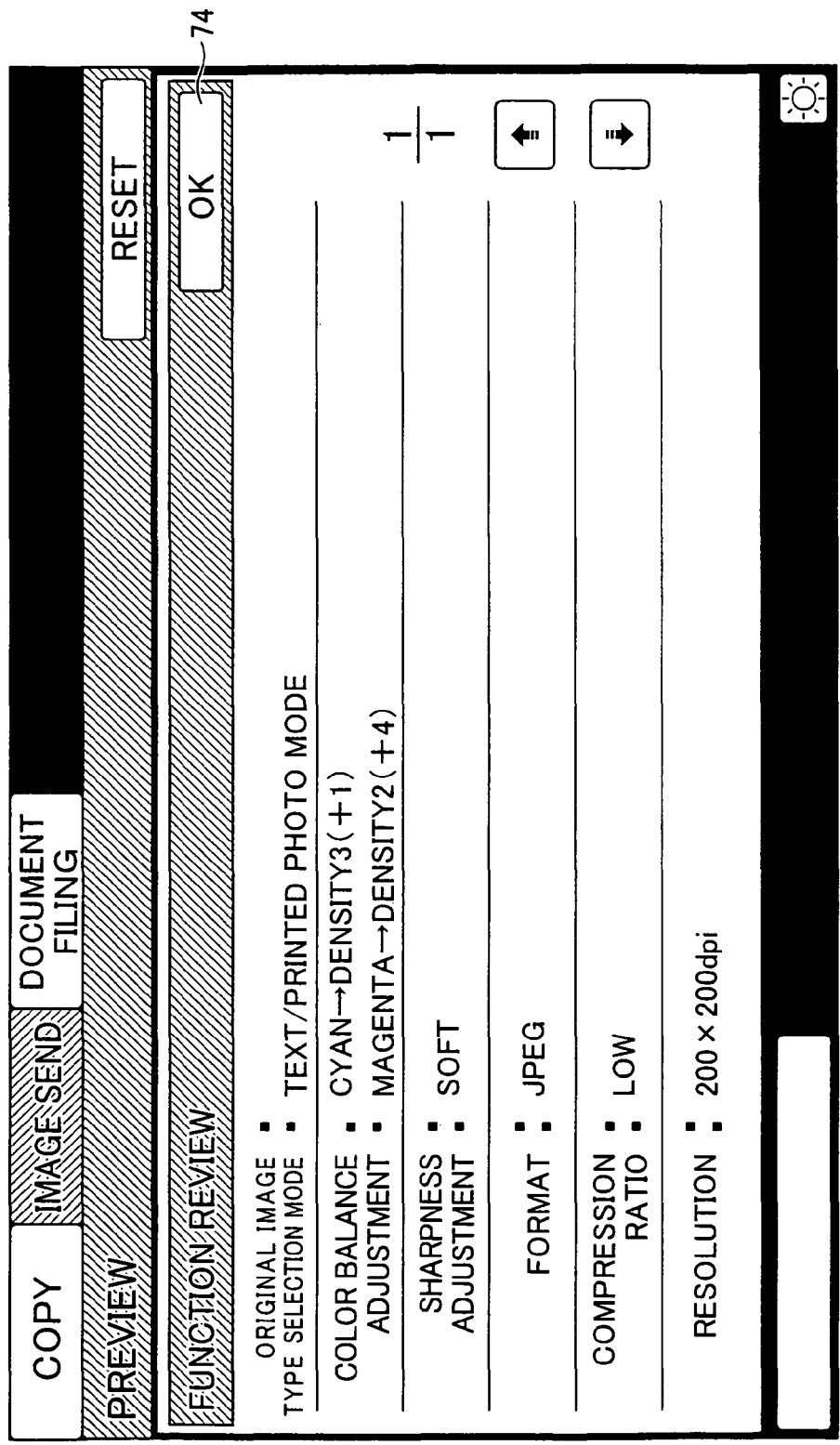
FIG. 16

FIG. 16 shows a setting confirmation image in the image transmission mode. The setting confirmation image shows the document type-based process mode, the adjustment of color balance, the sharpness adjustment, the format process, the compression process, and the resolution conversion to a user. Out of the items shown in FIG. 16, the items of the document type discrimination mode, the compression process, and the resolution show default process contents (values) in a case where the user does not select a process content (value).

Further, in the present embodiment, a preview of an output image and a setting confirmation image are separately shown to a user. Alternatively, a preview of an output image and a setting confirmation image may be displayed simultaneously. This allows a user to simultaneously see the preview of the output image and a process content that cannot be recognized by the user from the preview of the output image. Consequently, it is easy for the user to estimate the image quality of an image subjected to an output process.

As shown in FIG. 12, the display control device 110 of the present embodiment is provided separately from the image processing apparatus 102 and the image display device 104. Alternatively, the display control device 110 may be provided in the image processing apparatus 102 or in the image display device 104.

In the present embodiment, the display control device 110 informs, using an image, a user of an image process content which the user cannot recognize from a preview of an output image. Alternatively, the display control device 110 may inform the user of the image process content using audio guidance.

It should be noted that although an image process belonging to the second process content can be reflected on image data for preview display, the image process is not necessarily required to be reflected on the image data for preview display. That is, the present embodiment may be arranged so that the image process belonging to the second process content is carried out on output image data to be subjected to the output process (printing, transmission) whereas the image process belonging to the second process content is not carried out on output image data for preview display and instead the second process content is notified to a user. In this arrangement, too, the user can easily estimate the image quality of an image subjected to the output process.

The display control device 110 of the present embodiment may be a computer. In this case, The present embodiment can be achieved by storing, in a computer-readable storage medium containing program code (executable program, intermediate code program, or source program) to be executed by a computer, a process content executed by the display control device 110. This makes it possible to provide a portable storage medium containing the program.

In the present embodiment, the storage medium may be a memory (not shown) for processing in a microcomputer. For example, the storage medium may be a program medium such as a ROM per se. Alternatively, the storage medium may be a program medium that can read by inserting the storage medium into a program reading device provided as an external storage device (not shown).

In either case, the contained program code may be arranged to be accessible to a microprocessor that will execute the program code. Alternatively, the program code may be arranged to be read and then downloaded to a program storage area (not shown) of the microcomputer. It is assumed that the download program is stored in advance in the main apparatus.

It should be noted here that the program medium is a storage medium arranged to be separable from the main body. The storage medium may be, for example, a tape, such as a magnetic tape or a cassette tape; a magnetic disk, such as a flexible disk or a hard disk, or an optical disk, such as CD-ROM/MO/MD/DVD; a card, such as an IC card (memory card) or an optical card; or a semiconductor memory, such as a mask ROM/EPROM (erasable programmable read-only memory)/EEPROM (electrically erasable programmable read-only memory)/flash ROM. All these storage media hold a program in a fixed manner.

Alternatively, since the present embodiment is a system configuration connectable to communication networks including the Internet, the program medium may be a medium carrying the program code in a flowing manner as in the downloading of a program over a communication network. Further, when the program code is downloaded over a communications network in this manner, the download program may be stored in advance in the main apparatus or installed from another storage medium. The present invention can be realized in the form of a computer data signal, embedded in a carrier wave, in which the program code is embodied electronically. The storage medium is read by a digital color image forming apparatus of a program reading device provided in a computer system, whereby the aforementioned image processing method is executed.

In order to achieve the foregoing object, a display control device of the present invention is a display control device for controlling a display device capable of displaying a preview of an output image that is to be subjected to an output process, before the output image is subjected to the output process, the display control device including a notification section for (i) referring to a storage section in which specific information specifying an image process which a user cannot recognize from a previewed output image is stored, (ii) selecting an image process specified by the specific information out of image processes to be carried out on the output image, and (iii) notifying a user of a content of the selected image process.

Since the display control device of the present invention includes the notification section for notifying a user of the content of the image process which the user cannot recognize from the previewed output image, the display control device yields an effect that the user can correctly understand the content of the image process to be carried out on the output image and the image quality of the output image subjected to the output process.

The display control device of the present invention may be arranged so that the notification section serves as an image display control section for causing the display device to display a setting confirmation image showing the content of the selected image process. Further, the display control device of the present invention may be arranged so that the image display control section causes the display device to display the output image and an input button from which a display command for the setting confirmation image is inputted, and when the image display control section detects input of the display command from the input button, the image display control section causes the display device to display the setting confirmation image. Therefore, it is possible to switch between display and non-display of the setting confirmation image in response to a user's request. This provides a device usable also by a user who considers the display of the setting confirmation image as unnecessary.

The display control device of the present invention may be arranged so that the image display control section causes the display device to display both of the output image and the setting confirmation image. This arrangement allows a user to see both of the previewed output image and the process content image, allowing the user to easily estimate the image quality of an image subjected to the output process.

Further, it is preferable to arrange the display control device of the present invention so that the output process is at least one of a printing process for printing the output image, a facsimile transmission process for transmitting the output image via facsimile, a mail transmission process for transmitting the output image in such a manner that the output image is attached to an e-mail, and a filing process for converting the output image into an image file with a predetermined file format and storing the image file. Further, it is preferable to arrange the display control device of the present invention so that the image process specified by the specific information is at least one of a color balance adjustment process for adjusting density of the output image with respect to each color component, a sharpness adjustment process that is a sharpening process or a blur process carried out on the output image, a format process for converting the output image into an image file with a predetermined file format, a compression process for compressing the output image, a resolution conversion process for converting resolution of the output image, and a document type-based process for selecting, in accordance with a result of document type discrimination, contents of an image process to be carried out on the output image.

Further, an image forming apparatus of the present invention includes the display control device, the display device, and an image processing apparatus for carrying out the image process on the output image. Further, a method of the present invention is a method for controlling a display device capable of displaying a preview of an output image that is to be subjected to an output process, before the output image is subjected to the output process, the method including the steps of (i) referring to a storage section in which specific information specifying an image process which a user cannot recognize from a previewed output image is stored, (ii) selecting an image process specified by the specific information out of image processes to be carried out on the output image, and (iii) notifying a user of a content of the selected image process.

The method of the present invention may be realized by a computer. In this case, the present invention encompasses a control program for causing a computer to execute the steps and a computer-readable storage medium in which the control program is stored.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below. Further, numerical range beyond the range disclosed in the present invention may be encompassed in the present invention provided that the numerical range is a reasonable range that is not against the sprit of the present invention.

INDUSTRIAL APPLICABILITY

The display control device of the present invention is applicable to a display device capable of displaying a preview of an output image. A particularly preferable example of the display device is one included in a multifunctional printer, a copier, a printer, a facsimile device etc.

The invention claimed is:

1. A display control device for controlling a display device capable of displaying a preview of an output image that is to be subjected to an output process and that has been subjected to an image process, and that has been subjected to an image process, before the output image is subjected to the output process, said display control device comprising:
   a processor; and
   a storage section in which specific information specifying an image process which a user cannot recognize from a preview of an output image displayed by the display device is stored in advance,
   the processor serving as a notification section for (i) acquiring, from an image processing apparatus that carries out an image process on an image to be subjected to the output process, identification information indicative of an image process carried out on the image to be subjected to the output process, (ii) comparing the specific information stored in the storage section with the identification information so as to select an image process specified by the specific information out of image processes to be carried out on the image to be subjected to the output process, and (iii) notifying a user of a content of the selected image process,
   wherein the image process specified by the specific information is at least one of a color balance adjustment process for adjusting density of the image to be subjected to the output process with respect to each color component, a sharpness adjustment process that is a sharpening process or a blur process carried out on the image to be subjected to the output process, a format process for converting the image to be subjected to the output process into an image file with a predetermined file format, a compression process for compressing the image to be subjected to the output process, a resolution conversion process for converting resolution of the image to be subjected to the output process, and a document type-based process for selecting, in accordance with a result of document type discrimination, contents of an image process to be carried out on the image to be subjected to the output process,
   wherein the notification section serves as an image display control section that causes the display device to display a setting confirmation image showing the content of the selected image process, and
   when the image display control section detects input of the display command for setting confirmation image, the image display control section causes the display device to display the setting confirmation image.

2. The display control device as set forth in claim 1, wherein the image display control section causes the display device to display both of the output image and the setting confirmation image.

3. The display control device as set forth in claim 1, wherein the output process is at least one of a printing process for printing the output image, a facsimile transmission process for transmitting the output image via facsimile, a mail transmission process for transmitting the output image in such a manner that the output image is attached to an e-mail, and a filing process for converting the output image into an image file with a predetermined file format and storing the image file.

4. An image forming apparatus, comprising: a display control device as set forth in claim 1; the display device; and the image processing apparatus.

5. A method for controlling a display device capable of displaying a preview of an output image that is to be subjected to an output process and that has been subjected to an image process, before the output image is subjected to the output process, said method causing a computer controlling the display device to carry out the steps of:
   (i) acquiring, from an image processing apparatus that carries out an image process on an image to be subjected to the output process, identification information indicative of an image process carried out on the image to be subjected to the output process,
   (ii) referring to a storage section in which specific information specifying an image process which a user cannot recognize from a preview of an output image displayed by the display device is stored in advance and comparing the specific information with the identification information so as to select an image process specified by the specific information out of image processes to be carried out on the image to be subjected to the output process, and (iii) notifying a user of a content of the selected image process, wherein the image process specified by the specific information in step (ii) is at least one of a color balance adjustment process for adjusting density of the image to be subjected to the output process with respect to each color component, a sharpness adjustment process that is a sharpening process or a blur process carried out on the image to be subjected to the output process, a format process for converting the image to be subjected to the output process into an image file with a predetermined file format, a compression process for compressing the image to be subjected to the output process, a resolution conversion process for converting resolution of the image to be subjected to the output process, and a document type-based process for selecting, in accordance with a result of document type discrimination, contents of an image process to be carried out on the image to be subjected to the output process, the notification section serving as an image display control section that causes the display device to display a setting confirmation image showing the content of the selected image process, and the image display control section detecting input of the display command for setting confirmation image and, and when detected, causing the display device to display the setting confirmation image.

6. A non-transitory computer-readable storage medium in which a control program for causing a computer to execute a method for controlling a display device as set forth in claim 5 is stored, the control program causing the computer to execute the steps.

* * * * *